US011900483B2

(12) United States Patent
Doken

(10) Patent No.: US 11,900,483 B2
(45) Date of Patent: Feb. 13, 2024

(54) SYSTEMS AND METHODS FOR ENABLING SOCIAL INTERACTIONS DURING A MEDIA CONSUMPTION SESSION

(71) Applicant: Rovi Guides, Inc., San Jose, CA (US)

(72) Inventor: Serhad Doken, Bryn Mawr, PA (US)

(73) Assignee: Rovi Guides, Inc., San Jose, CA (US)

( * ) Notice: Subject to any disclaimer, the term of this patent is extended or adjusted under 35 U.S.C. 154(b) by 37 days.

(21) Appl. No.: 17/557,563

(22) Filed: Dec. 21, 2021

(65) Prior Publication Data

US 2023/0196478 A1 Jun. 22, 2023

(51) Int. Cl.
*G06Q 50/00* (2012.01)
*H04N 21/4788* (2011.01)
*G06F 16/783* (2019.01)
*H04N 21/431* (2011.01)
*G06F 3/04817* (2022.01)

(52) U.S. Cl.
CPC .......... *G06Q 50/01* (2013.01); *G06F 16/783* (2019.01); *H04N 21/4312* (2013.01); *H04N 21/4788* (2013.01); *G06F 3/04817* (2013.01)

(58) Field of Classification Search
CPC ... G06Q 50/01; G06F 16/783; G06F 3/04817; H04N 21/4312; H04N 21/4788
See application file for complete search history.

(56) References Cited

U.S. PATENT DOCUMENTS

| | | | |
|---|---|---|---|
| 9,183,172 B1* | 11/2015 | Anderson | G06Q 50/01 |
| 9,479,696 B1* | 10/2016 | Miller | H04N 9/8042 |
| 9,654,534 B2* | 5/2017 | Nguyen | H04L 67/1012 |
| 9,668,023 B1 | 5/2017 | Twyman et al. | |
| 10,708,674 B2 | 7/2020 | Wondra et al. | |
| 2013/0282839 A1* | 10/2013 | Alcala | G06Q 50/01 709/206 |
| 2014/0089801 A1* | 3/2014 | Agrawal | H04N 21/6582 715/719 |
| 2017/0300890 A1* | 10/2017 | Wereski | G06T 11/60 |
| 2019/0099653 A1* | 4/2019 | Wanke | G06Q 50/01 |
| 2019/0200054 A1* | 6/2019 | Dharmaji | H04N 21/4788 |
| 2020/0137011 A1* | 4/2020 | Guthery | G06Q 40/12 |
| 2021/0060404 A1* | 3/2021 | Wanke | G06Q 50/01 |
| 2022/0182251 A1* | 6/2022 | Jacobs | H04N 21/84 |

* cited by examiner

*Primary Examiner* — Florian M Zeender
*Assistant Examiner* — Karma A El-Chanti
(74) *Attorney, Agent, or Firm* — Haley Guiliano LLP

(57) ABSTRACT

Systems and methods are described for generating a media asset for presentation during a consumption session associated with a user profile, and while generating for presentation the media asset, generating for presentation an option to enable a social network profile, associated with a social network and associated with the user profile, to interact with a social network profile of a performer included in a cast of the media asset. In response to receiving selection of the option, an image of a frame of a current scene of the media asset may be extracted, and input associated with the image of the frame may be received. A request to post a message on the social network may be transmitted, toe enable a plurality of devices to access the message via the social network, and the message may comprise the extracted image of the frame and the received input.

16 Claims, 16 Drawing Sheets

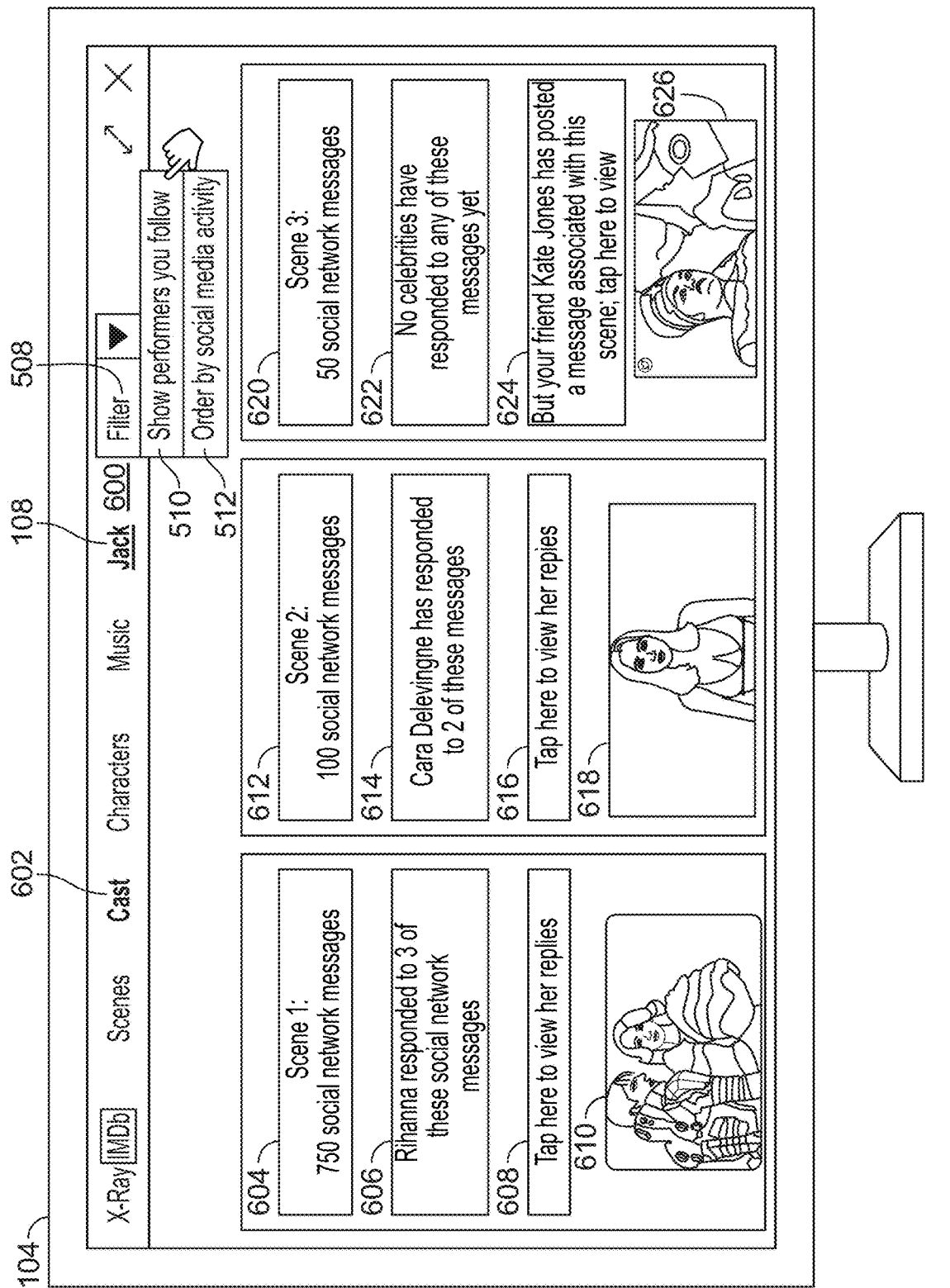

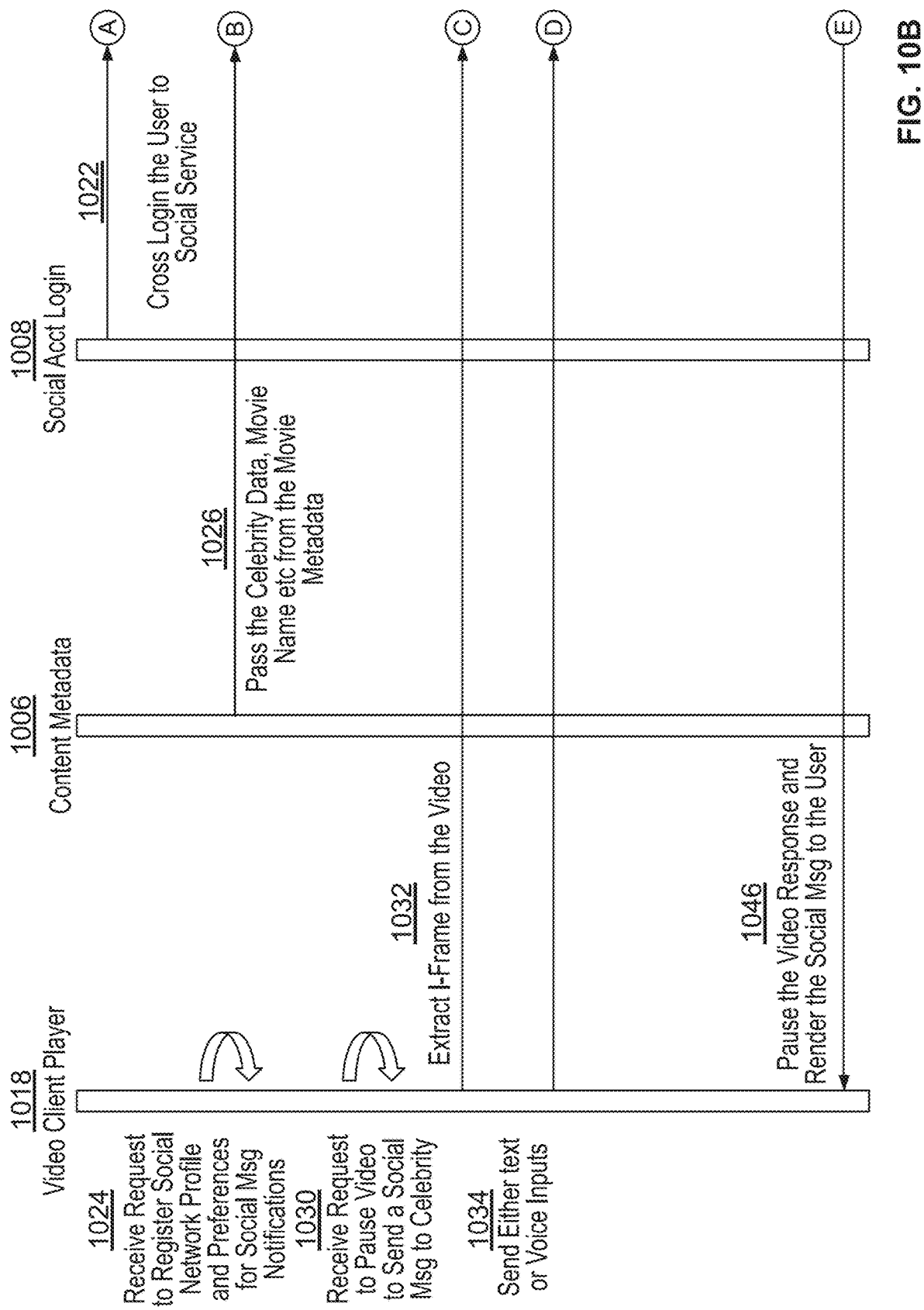

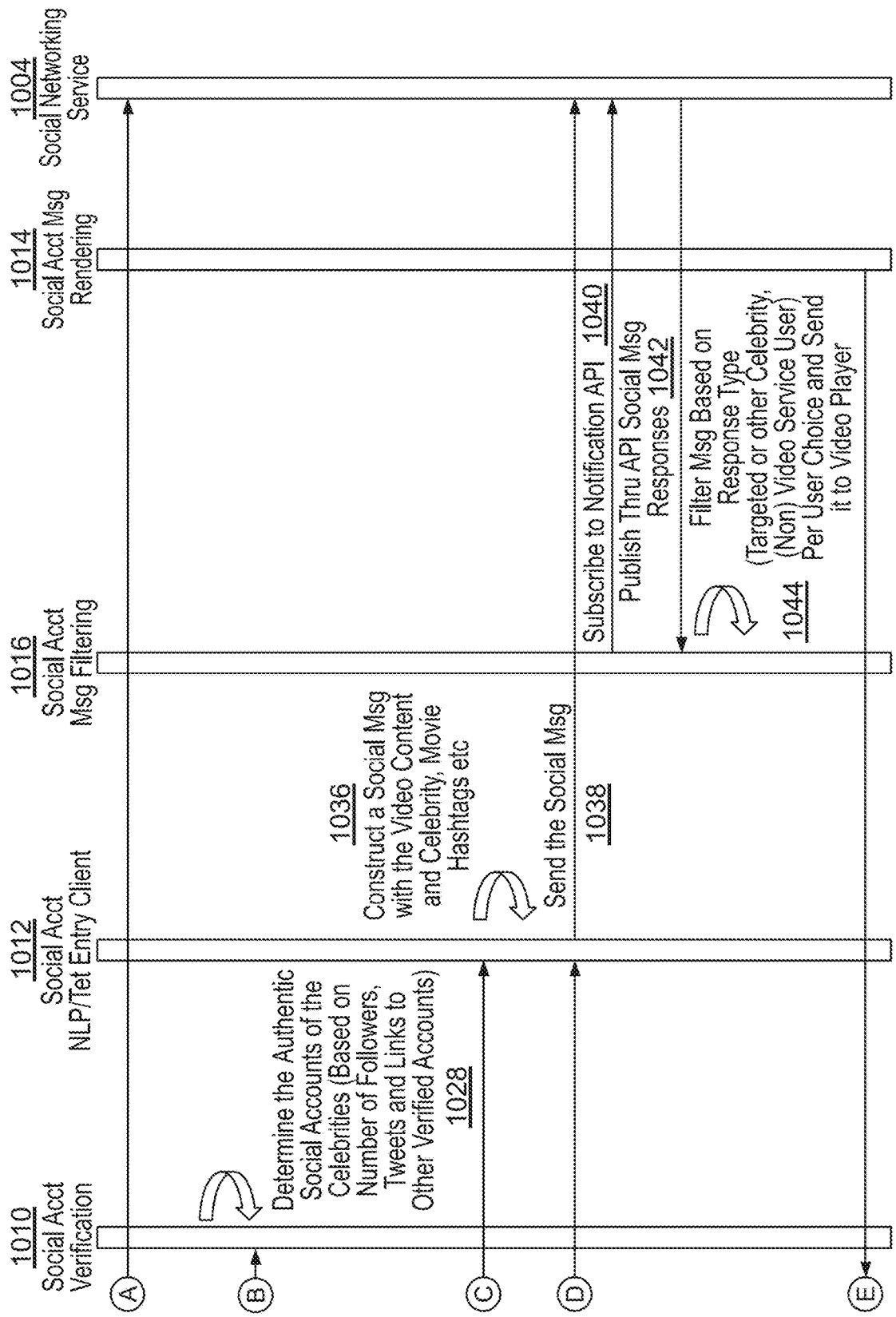

SYSTEMS AND METHODS FOR ENABLING SOCIAL INTERACTIONS DURING A MEDIA CONSUMPTION SESSION

BACKGROUND

This disclosure is directed to systems and methods for integrating, or establishing a connection between, social network platforms or services and media content (e.g., video and/or audio) platforms or services. In particular, techniques are disclosed for enabling a social network profile, associated with a social network and associated with a user profile of a user consuming a media asset, to interact with a social network profile of a performer included in a cast of the media asset.

SUMMARY

In recent years, streaming services and video-on-demand (VOD) services have greatly expanded their scope in terms of content availability, user engagement and number of hours viewed. Social network or social media platforms have also experienced an astronomic ascent, e.g., celebrities and social influencers may enjoy or be compensated for interacting with their fan base and sharing content regarding their daily life, which may help build their personal brand. However, although such celebrities and social influencers often share a significant amount of content about their daily life on social platforms, such content is often not related to their work (movies, songs, etc.) which is what many fans wish to learn more about and why many fans are interested in the celebrities.

Further, VOD services typically have little overlap with social media platforms. For example, VOD users are not able to engage with performers (e.g., celebrities, actors, or actresses) included in a cast of a media asset available on the VOD platform, and instead must separately access a social media platform in order to interact with such performers. This may be inconvenient for a user, particularly if he or she desires to interact with the social network profile of the performer (or social network profile of another user) regarding a particular scene in a media asset being consumed via the VOD service. Moreover, it may be undesirable from the perspective of a VOD content provider for users engaged in consuming content to exit the VOD platform in order to access a social network platform, e.g., the user may decide not to continue consuming content after exiting or become distracted by the social network platform.

To help overcome these problems, systems and methods are provided herein for generating a media asset for presentation during a consumption session associated with a user profile, and while generating for presentation the media asset, generating for presentation an option to enable a social network profile, associated with a social network and associated with the user profile, to interact with a social network profile of a performer included in a cast of the media asset. In response to receiving selection of the option, an image of a frame of a current scene of the media asset may be extracted, and input associated with the image of the frame may be received. A request to post a message on the social network may be transmitted, where the message comprises the extracted image of the frame and the received input, and the transmitting enables a plurality of devices to access the message via the social network.

Such aspects enable the presentation of an intuitive, user-friendly user interface to increase interactivity and engagement with respect to the content being consumed in real time between the consumer and a performer included in a cast of the content (e.g., a celebrity). For example, content related to a current scene of a media asset may be conveniently captured, to enable the user to request to post such content, as well as any desired message, on a social network platform that other devices (e.g., a device associated with a performer included in a cast of the media asset, another celebrity, or a friend of the user, or any other suitable device) can access and interact with. Such approach may enable media content to attract more users and encourage users to access the media content provider more frequently, e.g., as a central hub where they can both consume content and interact with other users on a social media platform. In addition, such approach may be a convenient and effective mechanism for certain users (e.g., celebrities) to directly interact with fans regarding their work. For example, driving engagement with such past or current work of the celebrities or performers in the media asset may help them to increase their followers as well as bring more attention to their work and create a real-time flywheel, while alleviating the efforts typically required by them to create new social media content. Similarly, such a mechanism may help media content providers to attract more users to their platform due at least in part to providing such activity.

Moreover, both users and performers can be provided information regarding trending or popular scenes of a media asset associated with a large amount of social network activity, and/or notifications regarding messages related to scenes of interest, and can quickly join the conversation surrounding the popular scenes. In some embodiments, the provided notification may be one of a plurality of different types, to enable a user to quickly determine whether a social network message is associated with a social network profile of a celebrity or performer, or a social network profile of a regular user. In some embodiments, metadata related to the social network interactions facilitated by the systems and methods provided herein may be generated and stored in association with the media asset, such that any user currently consuming the media asset or consuming the media asset in the future may be provided access to the social interactions, e.g., notified via a notification while consuming the specific scene that the social network interactions related to.

In some aspects of this disclosure, the provided systems and methods further comprise, prior to generating for presentation the option to enable the social network profile associated with the user profile to interact with the social network profile of the performer, generating for presentation an option to associate the social network profile of the performer with the social network profile associated with the user profile, and, in response to receiving selection of the option to associate the social network profile of the performer with the social network profile associated with the user profile, transmitting a request to associate the social network profile of the performer with the social network profile associated with the user profile. For example, as an initial step, a user or subscriber of the media content provider may optionally be provided, e.g., via a profile associated with the user, with an option to register their social network account(s) or profile(s) with the media content provider.

In some embodiments, the provided systems and methods further comprise determining that a response to the message has been received from the social network profile associated with the performer, and generating a notification for presentation, while the media asset is being generated for display, indicating that the response to the message has been received. In response to receiving selection of the notification, such response may be caused to be generated for display.

In some embodiments, the provided systems and methods may be configured to identify a portion of the extracted image, associated with the message to be posted on the social network, should be cropped out or otherwise modified, and crop out or otherwise modify the identified portion.

In some aspects of this disclosure, the provided systems and methods further comprise determining that a response to the message has been received from a social network profile, of the plurality of devices, associated with a regular user, and generating a notification for presentation, while the media asset is being generated for display, indicating that the response has been received, wherein the notification differs from a notification that is generated for presentation in response to determining that a response to the message has been received from the social network profile associated with the performer.

In some embodiments, the provided systems and methods further comprise populating the input associated with the image of the frame with text based on metadata of the media asset. In some aspects of this disclosure, the provided systems and methods further comprise generating metadata associated with the response to the message and the message comprising the extracted image of the frame and the received input, wherein the metadata comprises an association between the response to the message, the message, and a time stamp of the current scene of the media asset; and generating for presentation the notification, during a subsequent consumption session, during the presentation of the current scene of the media asset. In some embodiments, the provided systems and methods further comprise generating for display an indication of an amount of social network activity associated with the social network profile of the performer with respect to the media asset. In some aspects of this disclosure, the provided systems and methods further comprise generating for display an indication of an amount of social network activity for the current scene of the media asset.

In some embodiments, the media asset may be an audio-based media asset, and the provided systems and methods may further comprise determining a lyric associated with the audio-based media asset, extracting the lyric of the audio-based media asset, and recommending the extracted lyric for inclusion in the message to be posted on the social network.

In some embodiments, the provided systems and methods further comprise generating for display a plurality of identifiers corresponding to respective performers included in the cast of the media asset, and providing a plurality of options to associate the social network profile associated with the user profile with respective social network profiles of the plurality of performers. An order of the plurality of identifiers may be based on an amount of social network activity associated with the respective performers associated with the plurality of identifiers.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 6 shows an illustrative user interface provided by a system for transmitting a request to post a message on a social network while generating a media asset for presentation, in accordance with some embodiments of this disclosure.

FIGS. 10A-10B shows illustrative systems, and an illustrative process for transmitting a request to post a message on a social network while generating a media asset for presentation, in accordance with some embodiments of this disclosure.

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, teleconferencing, videoconferencing, and/or any other media or multimedia, and/or any suitable combination of the above.

Figure 1:
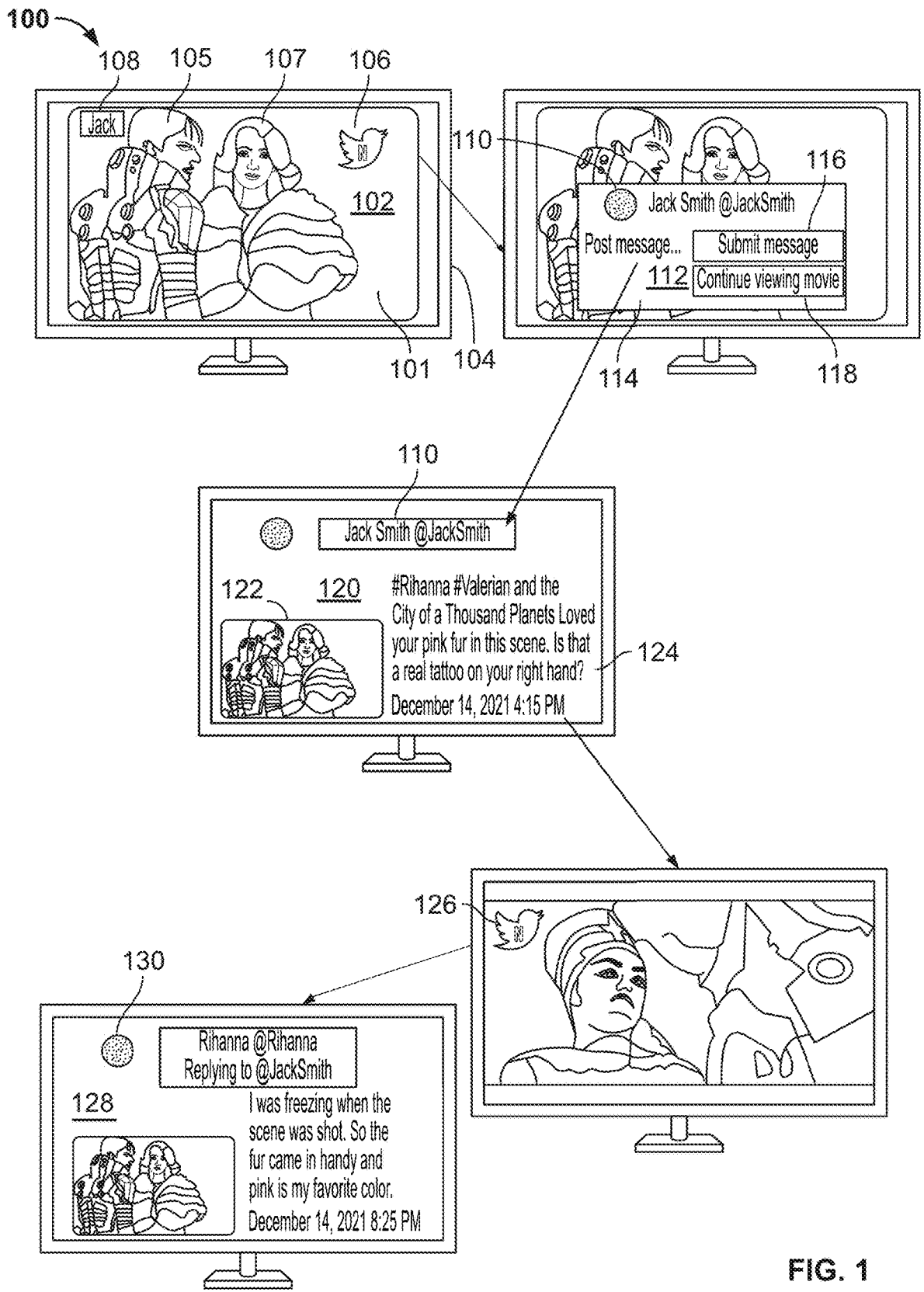
FIG. 1 shows a block diagram of an illustrative system for transmitting a request to post a message on a social network while generating a media asset for presentation, in accordance with some embodiments of this disclosure.

FIG. 1 shows a block diagram of an illustrative system for transmitting a request to post a message on a social network while generating a media asset for presentation, in accordance with some embodiments of this disclosure. A media application (e.g., executed at least in part on user equipment device 104) may generate for display media asset 102 on user equipment device 104, e.g., in response to receiving a user request to view media asset 102. Media asset 102 may be generated for display from a broadcast or stream received at user equipment device 104, or from a recording or copy stored in a memory of user equipment device 104 and/or a remote server (e.g., from media content source 902 or server 904 of FIG. 9). User equipment device 104 may be, e.g., a television and/or may include an integrated display, e.g., on a smartphone or tablet, or may be connected to an external display device, e.g., a television, or any other suitable device, or any combination thereof. In some embodiments, the media application may be (or may be in communication with) an over-the-top (OTT) provider, cable or satellite provider, or any other suitable media provider, or any combination thereof; and media asset 102 may be a program that is available, on demand or live, via the provider. Upon receiving a selection to consume media asset 102, the media application may retrieve (or request a media content source to provide) media asset 102 for display. In some embodiments, the media application may first determine whether the user is authorized to access the media asset 102.

The media application may be configured to store and/or provide access to media assets in association with registered user accounts and/or profiles. The media application may be associated with a content source and/or facilitate access to media assets from other content sources. For example, a media application user may register or be provided with an account or profile with the media application, and may access content via such profile, which may track the user's consumption habits and interactions with media assets, to build a content consumption history associated with the user profile. The media application may enable a user to access media assets using any number of user equipment devices at which the user provides his or her credentials, and from any number of different locations. In some embodiments, the media application user may be allocated a certain amount of storage space (e.g., at source 902 or source 904 of FIG. 9) available for storing recorded content items. In some embodiments, the media application may store and/or have access to any other suitable data (e.g., metadata of media assets consumed, consumption history data, user interaction data, social networking account information, other content sources the user subscribes to, etc.).

During a consumption session associated with a particular user profile (e.g., associated with a user named "Jack") associated with the media application and indicated at 108, the media application may be generating for presentation scene 101 of media asset 102. Scene 101 may be associated with a particular progress point within the total runtime or duration of media asset 102. In some embodiments, the media application may provide a progress bar overlaid on scene 101 indicating a current play position time within the total time duration of media asset 102. While generating for presentation scene 101, the media application may generate for presentation icon 106 associated with one or more social networks that the user associated with the profile indicated at 108 is subscribed to or is a member of. For example, the media application may determine (e.g., based on information stored at server 902 or 904 of FIG. 9) that such user associated with the profile indicated at 108 also has an account or profile with a particular social networking service (e.g., Twitter®), and thus may determine to generate for presentation icon 106. Scene 101 may comprise depictions of a plurality of objects, e.g., performer 105 and performer 107.

In some embodiments, the media application may generate for presentation icon 106 (and/or any other suitable icon discussed herein used to notify a user of a new social networking post) in a manner that enhances a social networking service icon with its own icon to differentiate icon 106 from a regular or standard social network message, or in any other suitable manner to distinguish icon 106 from a social networking message not associated with the media application. In the example of FIG. 1, a logo for the social networking service "Twitter®" may be enhanced to include a logo of the media provider "Netflix®." Such features may attract certain users to subscribe to the integrated media application and social media service, if such users are not otherwise subscribed to a particular media service or social networking service or combination thereof.

In some embodiments, icon 106 may be generated for presentation throughout the presentation of media asset 102, or in response to receiving user input (e.g., to pause media asset 102, and/or to instruct media asset 102 to provide icon 106). In some embodiments, the media application may generate for presentation icon 106 in response to determining that a particular scene is likely to interest the user consuming media asset 102, e.g., by comparing preferences indicated in the user profile (e.g., for a particular performer, or particular types of scenes) to characteristics of a current scene. To determine characteristics of the current scene, the media application may analyze metadata of the current scene, perform audiovisual processing of the current scene, and/or determine that the current scene is associated with a significant amount of social media activity. In some embodiments, detecting an object may comprise utilizing one or more techniques for object recognition such as, for example, image processing, edge detection, color pattern recognition, partial linear filtering, regression algorithms, and neural network pattern recognition. The media application may perform image analysis on each object that is detected to determine the identity of each object, and may be configured to search a database of videos and associated objects for each of the plurality of candidate objects.

In response to receiving selection of or input otherwise associated with icon 106, the media application may cause overlay 112 to be generated for presentation. Overlay 112 may be associated with the social network profile indicated at 110, and the profile may be specified in the media application profile indicated at 108 as being associated with the user, e.g., "Jack." For example, the user "Jack" viewing media asset 102 may also have a social networking profile with one or more social networking providers (e.g., Twitter) associated with icon 106 and overlay 112. In some embodiments, the media application may cause overlay 112 to be generated for display by way of an API call to the social networking service provider. In some embodiments, the media application may cause the presentation of media asset 102 to be paused when displaying overlay 112. A portion of media asset 102 may continue to be displayed and may be visible to the user when overlay 112 is generated for display; overlay 112 may be generated for display in place of paused media asset 102; or presentation of media asset 102 may continue and may not be paused while generating for presentation overlay 112. In some embodiments, the user may specify settings to indicate how he or she would like overlay 112 to be displayed, and/or in what circumstances icon 106 should be generated for display (e.g., at all times, in response to user input and/or based on analysis of the current scene). Overlay 112 may comprise a portion 114 at which a user may input a message (e.g., via text, voice utterance, tactile or any suitable input), a portion 116 that is selectable to submit a composed input message for sharing via the social networking platform, and/or a portion 118 to continue viewing media asset 102 (e.g., if media asset 102 is paused, to cease generating for display overlay 112 and resume media asset 102 from scene 101). In some embodiments, the user may utilize a voice recognition interface (e.g., on a remote control device in communication with user equipment 104) to input a message to portion 124.

In some embodiments, in response to receiving selection of icon or option 106, the media application may extract an image of a frame of a current scene 101 of media asset 102 and receive input associated with the image of the frame. For example, social media post 120 submitted by the user may comprise extracted image 122 of a frame of scene 101 and portion 124. In some embodiments, the user may have the option to remove image 122 from the post. Portion 124 may comprise any suitable content, e.g., text, emojis, images, videos, animations, etc., input by the user. In some embodiments, the media application may prepopulate portion 124, e.g., with template-based content such as, for example, recommended content, text or hashtags of performers identified in scene 101; genre information of the scene; and/or other information regarding media asset 102, e.g., #Rihanna #Valerian and the City of a Thousand Planets, to reduce input to be added to portion 124 of social network post 120. A request to post social media post 120, associated with the social network profile indicated at 110 (e.g., the same user as is associated with the user profile indicated at 108) may be transmitted to the social media networking service (e.g., Twitter servers or any other suitable servers) in response to receiving selection of option 116. In some embodiments, the media application may (e.g., via an API or any other suitable technique) be configured to access social network posts of a user, e.g., the user associated with the social network profile indicated at 110, even if such posts are private and not publicly available on the social media network. In some embodiments, the media application may be configured to access social network posts of a user that are publicly available via an API or any other suitable technique (e.g., a web crawl, accessing the web page or application hosting the publicly available social media posts, or any other suitable technique). Based on accessing the historical private or public social network messages of the user, the media application may prepopulate portion 124, e.g., with template-based content such as, for example, recommended content, text or hashtags in a personalized manner to this particular user. For example, the media application may determine that the user associated with the social network profile indicated at 110 frequently inputs certain words, phrases, images or emojis, or any other suitable content, or any combination thereof, into social media posts, and may provide one or more of such frequently input content as hashtags or other recommended content, suggested to be included in post 124.

In some embodiments, the media application may be configured to crop or otherwise modify image 122 of the frame, such as, for example, to focus on, emphasize or more prominently include a selected performer and/or certain context from current scene 101 and/or social network post 120. For example, the media application may crop out portions of image 122 in which no performers are presented, a portion where insignificant performers are presented or other objects not pertinent to social network post 120. The media application may determine which portions of image 124 to crop out (and/or which portions to accentuate or highlight) based on metadata associated with media asset 102, based on audiovisual analysis of current scene 101, based on user input indicating which portions of image 124 to crop out, or based on any other suitable technique, or any combination thereof. In some embodiments, cropping out certain portions of image or video 122 may enable less consumption of bandwidth or other computing resources, or any combination thereof, when transmitting a request to post message 120.

In some embodiments, such transmitted request to post social network message 120 may enable a plurality of devices to interact with social media post 120 via one or more social network platforms. For example, such plurality of devices may be associated with respective social networking profiles (e.g., with the same social network associated with icon 106, or any other suitable social network) of any users specified in the post (e.g., Rihanna, the performer depicted at 107) and/or any other performers in the cast of media asset 102, and/or any other followers or friends of the user profile indicated at 110, may be notified of social network post 120. In some embodiments, the devices may access social network post 120 based on a keyword search, e.g., for "Rihanna" or "Valerian," or via a group chat related to media asset 102 on the social networking service or media application. The users capable of interacting with social network post 120 may include users having an account or profile with the media application and the social networking service, as well as users having an account or profile with the social networking service but not having an account or profile with the media application.

Once social network post 120 is transmitted to the social networking service, the user may resume consuming media asset 102. The media application may cause icon 126 to be generated for display during presentation of media asset 102, based on receiving an indication from the social networking service that one or more users responded to or replied to social media post 120, e.g., in a same thread as social network post 120, or a social network response 128 that is otherwise associated with social network message 120. In some embodiments, social network response 128 may be received from another celebrity or performer associated with media asset 102 and/or within a same frame or scene of media asset, e.g., with performer 107.

In some embodiments, the manner of presenting icon 126 may vary based on which user posts the response message. For example, icon 126 may be of a first type if social network response 128 is received from the performer specified in social network post 120 (or to whom social network post 120 is directed), may of a second type if social network response 128 is received from another celebrity or performer associated with media asset 102, and/or may be of a third type if social network response 128 is from a regular user, e.g., a media application user and/or social networking user that is not associated with media asset 102 and/or is not a celebrity or particularly notable user. For example, the different types of notifications may be displayed in different manners (e.g., presented in different colors, shapes, sizes, locations on screen, at user equipment device 104 and/or a second screen device, such as, for example, a mobile device of the user in a vicinity of user equipment device 104; and/or presented with different or no audio alerts or haptic alerts, or any combination thereof). In the example of FIG. 1, social network post 128 may comprise content about a fur and/or a tattoo, which may be entered by performer 107, and transmitted to social network servers (e.g., server 916).

Depending on the notification or icon type, the user may decide to select icon 126, which may cause the media application to pause media asset 102, and interact with social network reply 128. For example, icon 126 may indicate that celebrity or performer 105 depicted in scene 101 of media asset 102 (and specified by the user associated with the accounts indicated at 108 and 110 in social network message 120) has replied to social network message 120 via a social network profile indicated at 130 and associated with performer 105 and/or has otherwise mentioned the user associated with the user profile indicated at 108. Social network response 128 may comprise any suitable content, e.g., text answering a query included in social network post 120. Such reply may comprise an indication or mention of the user associated with the accounts indicated at 108 and 110, e.g., a referral to the original thread for subsequent user interaction and consumption of the prior associated social media posts. Social media posts 120 and 128 may be accessible while the user is accessing the media application. For example, the media application may communicate with the social networking service via an API to permit media application users to access social media posts 120 and 128 and any other related social media posts within the media application. In some embodiments, the media application may redirect the user to the social network service, e.g., in response to receiving selection of icons 106 and 126. In some embodiments, the media application, in response to a command received from the user, may publish the user-generated content to a plurality of users, e.g., within a messaging portion or comments section of the media application. In some embodiments, the media application may cause social media post 120 to be posted on each of the social networking services that the user is subscribed to, and/or any suitable blogs or websites associated with the user.

The media application may determine, or be notified by the social networking application, that social network message 128 is associated with social network post 120. For example, the media application and/or the social networking application may make such determination based on parsing and analyzing text, performing image processing, and/or performing natural language processing on social network messages 120, 128. In some embodiments, the determination may be made based on determining that a particular post (e.g., post 128) includes a mention (e.g., @JackSmith) of the user associated with the profile indicated at 110 and/or social media post 120.

The social network posts may comprise any media (e.g., photos, text, audio, video, or any combination thereof) and may optionally include a title portion and main content portion (e.g., an extracted image and/or text), and may comprise metadata (e.g., tags) describing the social network post and/or media asset 102 and/or performers or celebrities associated with the social network post and/or media asset 102. The tags may be determined based on image processing and object recognition techniques, and/or based on parsing the content of the social network post. In some embodiments, the social network post may be transmitted one-to-one, to a group, or hosted on the internet for any suitable user to consume (and react to). In some embodiments, social media posts 120 and 128 may reside on the same or different social media platforms. The user may be permitted to scroll, or otherwise navigate, through a media feed or timeline provided by the social network application associated with a social media platform, e.g., to view a thread comprising social media posts 120 and 128.

In some embodiments, the media application may generate metadata based on one or more of social network posts 120 and 128, and such metadata may be stored in connection with media asset 102. For example, the metadata may comprise one or more of social network posts 120 and 128 associated with a time stamp within the duration of media asset 102 that corresponds to scene 101. In some embodiments, each time the media application generates for presentation media asset 102 to a user, the metadata associated with media asset 102 may be retrieved or referenced, and based on such metadata, the media application may cause one or more of notification icons 106, 126 (and/or one or more of social network posts 120 or 128) to be generated for presentation to the user during scene 101. In some embodiments, most users may only be interested in social media post 128 associated with the social media profile of performer 107 (or a performer or other celebrity otherwise associated with media asset 102 and/or within the same frame or scene 101 of media asset 102), rather than social media post 120 associated with user profile 108, and thus may only be provided with notification icon 126 and/or social network post 128. In some embodiments, certain users (e.g., friends of the social network profile associated with user profile 108) may wish to view each of social network posts 120 and 128, and thus may be provided with notifications 106, 126 (and/or one or more of social network posts 120 or 128). For example, the user may be provided with an option (e.g., at user interface 400) to specify or filter which social network posts he or she wishes to be notified of (e.g., from performers in a current scene only, performers in a cast of the current media asset, any celebrity, only friends of the user, all users, etc.). In some embodiments, each time media asset 102 is consumed by a user subsequent to social media posts 120 and 128 being submitted, commentary associated with social media posts by performers (e.g., performer 105 of FIG. 1, performer 107 of FIG. 1, performer 210 of FIG. 2, etc.) may be presented to the user, e.g., in the form of a chat bubble or other indication of the content of social media posts 120 and 128. Such features may enable a conversation-like discussion or dialogue between performers in a scene to be presented to consuming users, with which consuming users can interact and which they can consume. For example, each scene of media asset 102 associated with a social network post of a performer or other celebrity may include a social network post by the social network post of a performer regarding the scene, and/or an indication that such a post exists and/or a selectable icon to access such a post. In some embodiments, social network post 128 may be presented overlapping or in a close proximity to the depiction of performer 107, or unobtrusively presented at a portion of the scene to avoid obscuring the ongoing scene.

Figure 2:
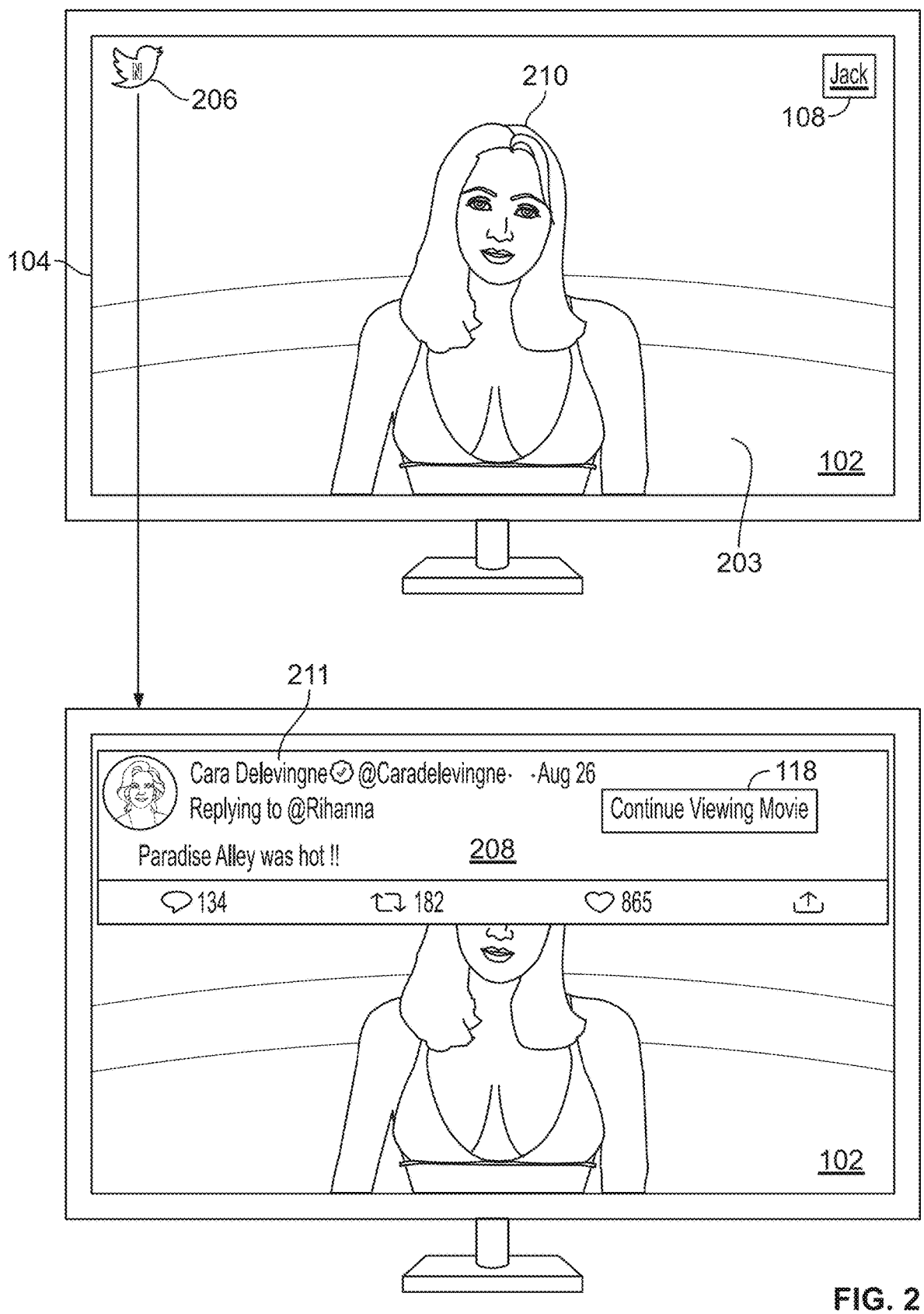
FIG. 2 shows illustrative user interfaces provided by a system for transmitting a request to post a message on a social network while generating a media asset for presentation, in accordance with some embodiments of this disclosure.

FIG. 2 shows illustrative user interfaces provided by a system for transmitting a request to post a message on a social network while generating a media asset for presentation, in accordance with some embodiments of this disclosure. The media application may be generating media asset 102 for presentation, and a user associated with the user profile indicated at 108 may be consuming media asset 102 at user equipment device 104. While consuming media asset 102, icon or notification 206 may be generated for display. Icon 206 may indicate to the user that a celebrity or performer 210 (depicted in scene 203 and associated with profile 211 with the social networking service) included in the cast of media asset 102 posted a message to the social networking service in association with, e.g., social network posts 120 and 128 of FIG. 1. In response to selecting icon 206, the media application may retrieve and/or request social network post 208 from the social networking service, and generate for display post 208, which may refer to one or more of social networking messages 120 and 128 of FIG. 1, e.g., as part of a same thread, and/or in reply to one or more of such messages. In some embodiments, notification 206 may be presented to the user in a different manner than notification 126. For example, the difference in the notifications may reflect that notification 206 may be associated with a performer not specified in social network post 120 of the user, yet still associated with a performer in a cast of media asset 102, whereas notification 126 may be associated with a performer specified in social network post 120 of the user. In some embodiments, the type of notification 206 presented to the user may vary based on whether the performer depicted in a current scene (performer 210 depicted in scene 203) is associated with social media post 208 having triggered notification 206. Social network post 208 may be provided as overlay, e.g., while media asset 102 is paused.

Figure 3:
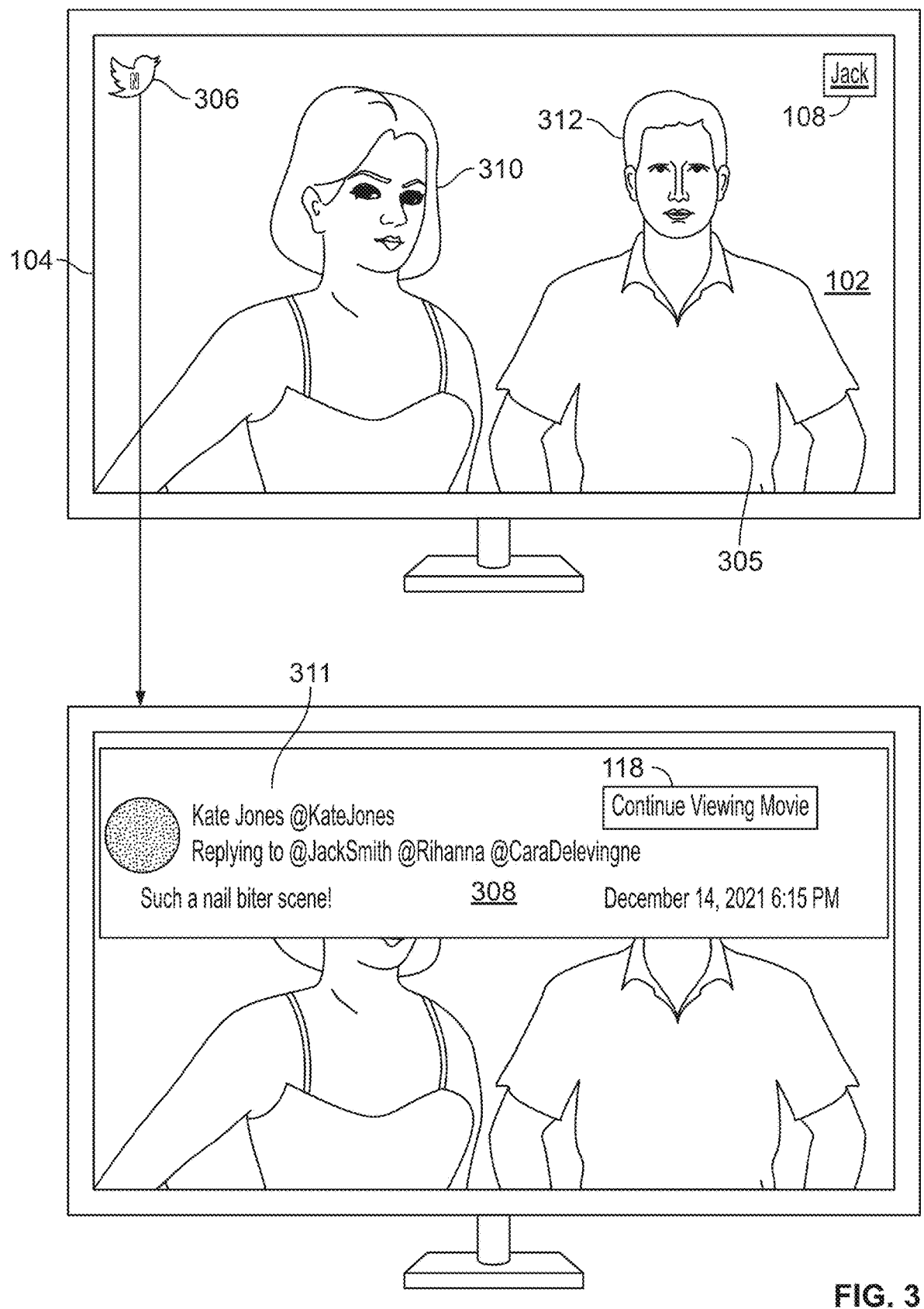
FIG. 3 shows illustrative user interfaces provided by a system for transmitting a request to post a message on a social network while generating a media asset for presentation, in accordance with some embodiments of this disclosure.

FIG. 3 shows illustrative user interfaces provided by a system for transmitting a request to post a message on a social network while generating a media asset for presentation, in accordance with some embodiments of this disclosure. The media application may be generating media asset 102 for presentation, and a user associated with the user profile indicated at 108 may be consuming media asset 102, and more specifically, scene 305 comprising objects 310 and 312 (e.g., actress 310 and actor 312). While consuming media asset 102, icon 306 may be generated for display. Icon 306 may indicate to the user that a regular user (e.g., a non-celebrity and/or non-performer) 311 posted a message to the social networking service in association with, e.g., social network posts 120 and 128 of FIG. 1, and/or social network post 208 of FIG. 2. In response to selecting icon 306, the media application may retrieve and/or request social network post 308 from the social networking service, and generate for display post 308 which may refer to one or more of social networking messages 120 and 128 of FIG. 1 and/or message 208 of FIG. 2, e.g., as part of a same thread, and/or in reply to one or more of such messages. In some embodiments, notification 306 may be presented to the user in a different manner than notification 126 of FIG. 1 and notification 206 of FIG. 2. For example, the appearance or other characteristics of notification 306 may indicate to the user that a regular user, e.g., the user's friend Kate Jones associated with the profile indicated at 311, has posted a message associated with one or more of messages 120, 128, 208, and message 308 may mention or otherwise reference the prior messages and/or users, e.g., "@JackSmith, @Rihanna, @CaraDelevingne. Social network post 208 may be provided as overlay, e.g., while media asset 102 is paused. In some embodiments, the media application may generate metadata comprising the content of post 308 (and any other social media posts on a thread with post 308 or otherwise associated with post 308) and the associated time stamp of scene 305. Each time the media application subsequently presents media asset 102, notifications associated with social network posts of scene 305, and/or such social network posts itself, may be provided when scene 305 is being presented.

Figure 4:
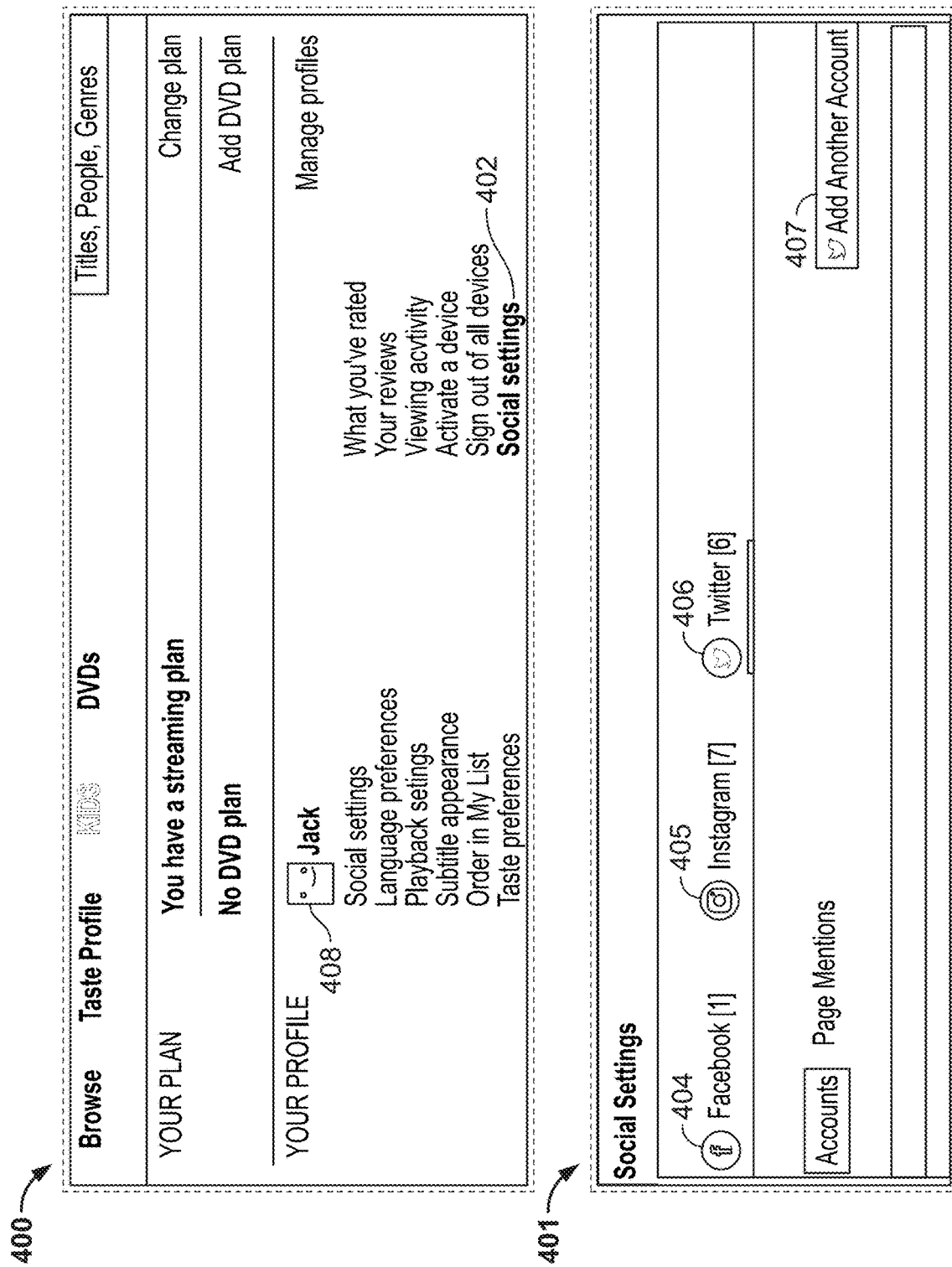
FIG. 4 shows illustrative user interfaces provided by a system for transmitting a request to post a message on a social network while generating a media asset for presentation, in accordance with some embodiments of this disclosure.

FIG. 4 shows illustrative user interfaces 400, 401 provided by a system for transmitting a request to post a message on a social network while generating a media asset for presentation, in accordance with some embodiments of this disclosure. User interface 400 may be provided by the media application and may permit a user (e.g., "Jack"), associated with the media application profile indicated at 408, to specify various preferences or settings associated with the user profile. For example, user interface 400 may comprise options to specify language preferences while consuming content associated with the media application, playback settings, subtitle appearance settings, order of media asset listings, taste preferences, or rating preferences, or view past reviews, view consumption activity, activate a device, sign out of the media application on all devices, and/or specify social settings 402, and/or any other suitable options, and/or any combination thereof. For example, upon receiving selection of option 402, user interface 401 may be generated for presentation by the media application. User interface 401 may permit the user to associate one or more of social networking platforms 404, 405, 406 with the media application, and/or add other social networking accounts by selecting option 407. For example, the media application may utilize an API to receive social networking account credentials from the user, or direct the user to the selected social networking platform, to register a particular social network account with the user profile indicated at 408. For example, by way of user interface 400, a video service subscriber, as an optional feature, through his or her media application profile, may be given the option to register their social network account(s) with the video service.

Figure 5A:
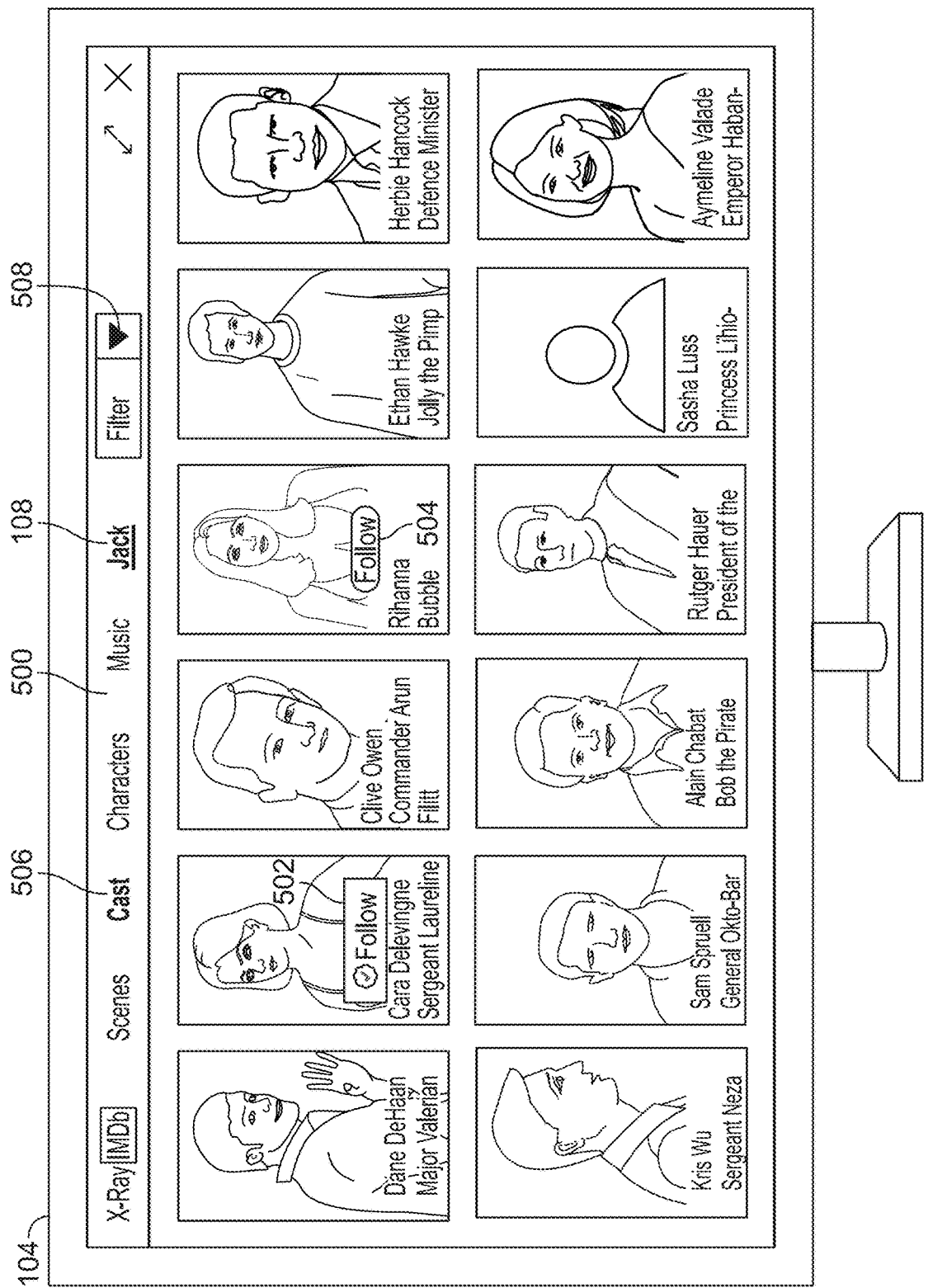
FIGS. 5A-5C shows illustrative user interfaces provided by a system for transmitting a request to post a message on a social network while generating a media asset for presentation, in accordance with some embodiments of this disclosure.
Figure 5B:
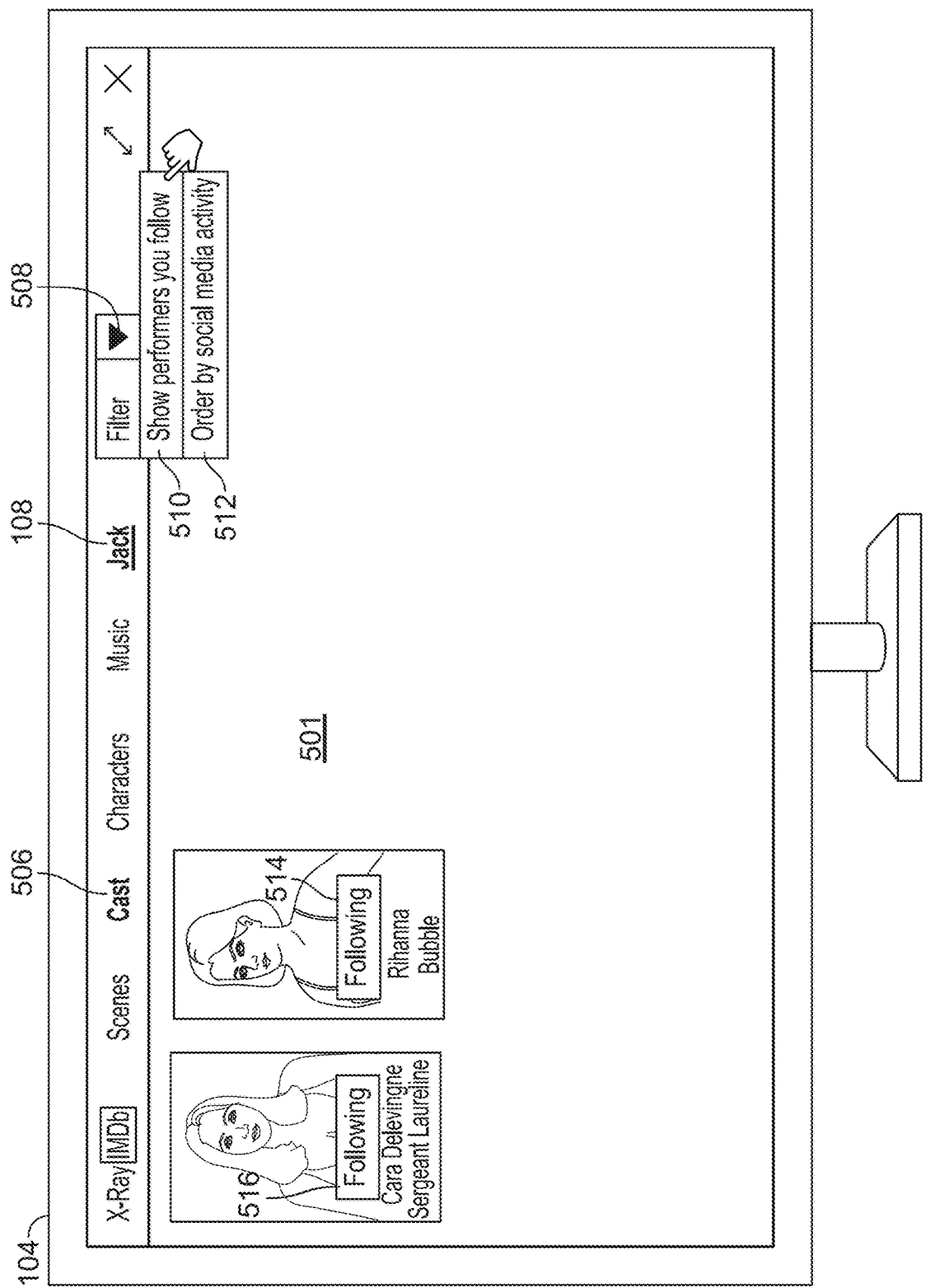
Figure 5C:
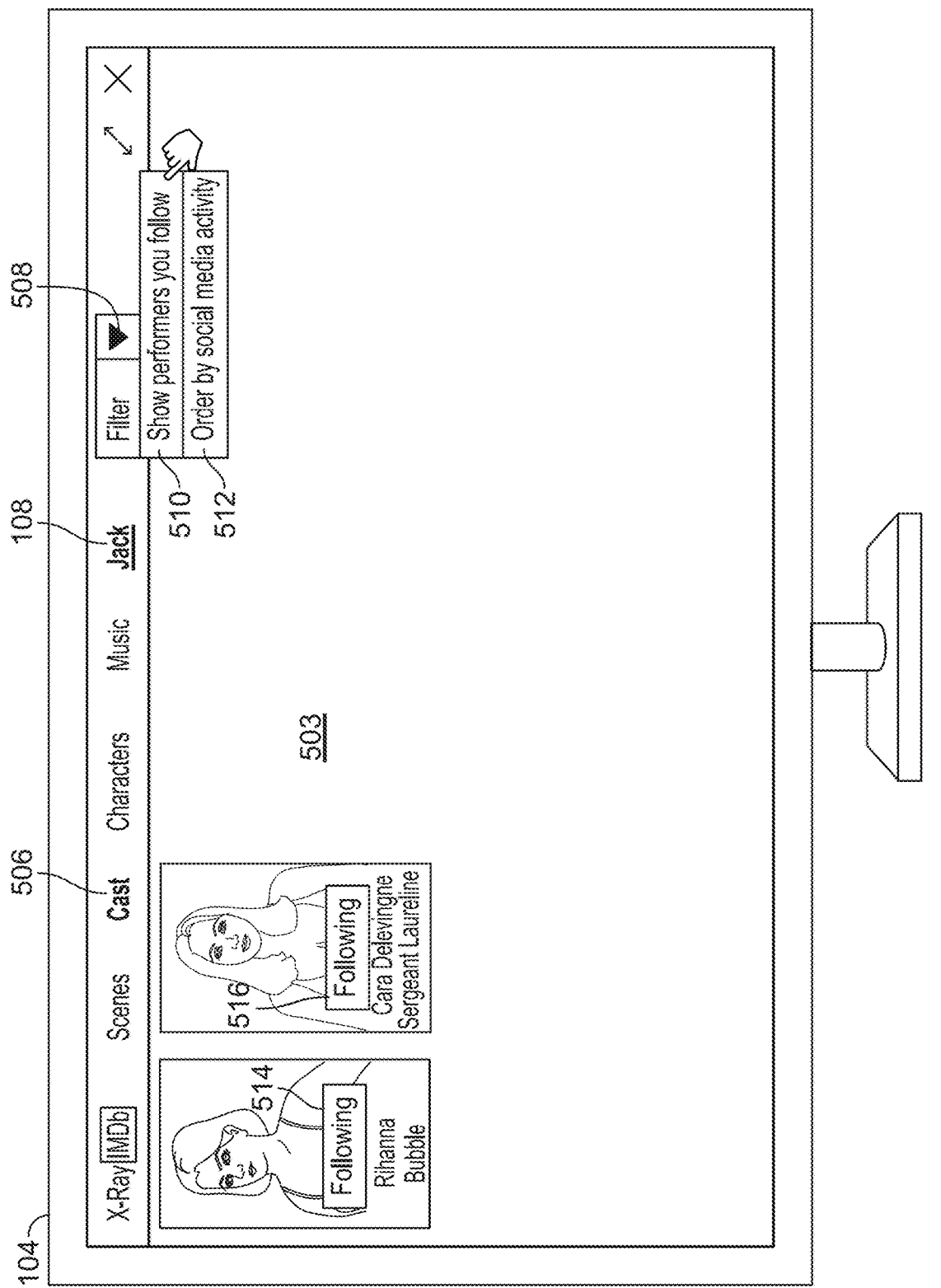

FIGS. 5A-5C show illustrative user interfaces provided by a system for transmitting a request to post a message on a social network while generating a media asset for presentation, in accordance with some embodiments of this disclosure. As shown in FIG. 5A, user interface 500 may be generated for display by the media application, e.g., in response to receiving a selection of a media asset listing associated with media asset 102. For example, user interface 500 may comprise identifiers of a plurality of performers (e.g., actors or actresses) included in a cast of media asset 102, which may be obtained, identified and/or extracted based on metadata associated with media asset 102. User interface 500 may be presented to a user associated with the user profile indicated at 108, and selection of option 504 (associated with the performer "Cara Delevingne" included in the cast of media asset 102) or selection of option 502 (associated with the performer "Rihanna" included in the cast of media asset 102) may associate a social networking account or profile of the user of the respective user profile indicated at 108 with the social networking account or profile of "Cara Delevingne" or "Rihanna." Such association may enable the user to communicate or interact with the celebrity and/or view social networking posts published by the celebrity or performer social networking account or profile.

In some embodiments, user interface 500 may be accessible while media asset 102 is being accessed by the user, e.g., a user may pause or otherwise select an option to cause an overlay comprising user interface 500 to be generated for display to the user, to follow a social networking account or profile of the celebrity or performer. In some embodiments, option 502 may indicate, and/or be a selectable function to follow or associate, a social networking account or profile of a performer (e.g., Cara Delevingne) with a social media profile of the user on a particular social networking platform (e.g., Instagram®), and option 504 may indicate, and/or be selectable function to follow or associate, a social networking account or profile of the performer (e.g., Rihanna) user with the same or different social networking platform (e.g., Twitter). In some embodiments, one or more social networking accounts associated with each performer depicted in user interface 500 may be selectable by way of respective options for each social networking platform, to associate with the user's social media account with the selected account(s). In some embodiments, the media application may perform a verification to ensure that the option is associated with the official, authentic account of the celebrity, e.g., and indicate it as such to the user by way of an indication (e.g., a blue check mark) associated with option 502. For example, the media application may communicate with the social network platform to ensure that a particular social network account or profile of the performer or celebrity is a validated account for the performer or celebrity. In some embodiments, the media application may cause user interface 500 to be generated for display in response to receiving selection of icon 506 corresponding to a cast of a currently selected media asset.

As shown in FIG. 5B, the media application may provide user interface 501 comprising filter option 508, which may comprise one or more options that are selectable to rearrange the plurality of identifiers of the cast of media asset 102. For example, selection of the arrow of filter option 508 may cause options 510 and 512 to be presented to the user, and in response to receiving selection of options 510, the media application may filter out any cast members that the social network account of the user is not currently associated with, thereby leaving only identifiers of performers that the user is currently associated with (e.g., following or friends with profiles on the social network of the performers). In some embodiments, the identifiers of the performers may be associated with respective icons 514, 516 comprising an indication that the user (e.g., the social network profile that is associated with the media application profile indicated at 108) is currently associated with social network accounts of such performers. In some embodiments, the respective identifiers may comprise an indication of one or more social network platforms of the profiles of the performers that the user profile is associated with. In some embodiments, the identifiers may be arranged by social network platforms that the performer profile is associated with, e.g., each performer associated with a Twitter account may be grouped together. In some embodiments, filter option 510 may provide an option to filter by a particular social network platform, e.g., to only show identifiers of performers having Instagram accounts that the user is associated with, and/or provide options to follow such performers on other social network platforms.

As shown in FIG. 5C, the media application may provide user interface 503 comprising filter option 508, in which both filter options 510 and 512 have been selected by the user. Based on such selections, the order of the identifiers of the performers included in the cast of media asset 102 may be different from the order shown at user interface 501 of FIG. 5B. For example, option 512 may correspond to ordering the identifiers based on how active a particular performer is on one or more social network platforms. In some embodiments, the ordering of the identifiers may depend on a frequency that a particular performer interacts with fans via social network posts associated with the media application-social network integration described herein. If filter option 512 is selected and option 510 is not selected, the identifiers of the performers presented to the user may include performers the user is not currently following, ordered based on social network activity (e.g., overall social network activity, or social network specific to media assets he or she is featured in, or social network activity specific to this particular media asset, etc.). In some embodiments, the media application may provide a user interface of the most popular current performers (e.g., not necessarily associated with a particular media asset) at which a user can request to follow or otherwise associate his or her social network profile with social network profiles of such popular performers. In some embodiments, option 510 and 512 can be combined into a single filter option.

In some embodiments, at one or more of the user interfaces of FIGS. 5A-5C, and/or while media asset 102 is being generated for presentation (e.g., as shown in FIG. 1), indications may be provided regarding a performer most likely to respond to a social media post, e.g., based on the performer's historical social network activity. For example, a particular on-screen performer may be highlighted or selectable to indicate to a user how often the performer interacts with fans on social network platforms, and more with specifically a social network post such as post 120 of FIG. 1. In some embodiments, at any time a user is interacting with the media application (e.g., at any of the user interfaces shown at FIGS. 1-7), the user may be provided with a notification regarding a social network message received from a particular performer, celebrity or other user. In some embodiments, a social media post associated with a particular performer or celebrity may be generated for display, e.g., in a chat bubble, between performers depicted on-screen (e.g., during a media asset and/or in a menu or settings screen). For example, the media application may provide, such as upon determining that multiple performers have submitted social network posts associated with each other (e.g., on the same thread), chat bubbles for each of the performers to simulate a conversation between the performers based on such performers social network posts.

FIG. 6 shows an illustrative user interface 600 provided by a system for transmitting a request to post a message on a social network while generating a media asset for presentation, in accordance with some embodiments of this disclosure. User interface 600 may be presented, e.g., in response to receiving user selection of option 602 ("Scenes") for a particular media asset, e.g., media asset 102. The media application may generate user interface 600 to comprise elements of one or more scenes from media asset 102 and social media activity associated with the scene. For example, user interface 600 may comprise an indication 604 that the scene associated with frame 610 is the subject of 750 social network messages (e.g., from one or more social network platforms), and an indication that a particular performer (e.g., Rihanna) depicted in the scene has responded to 3 of such social network messages. In some embodiments, option 608 may be provided, which may be selectable to view (and interact with) each of the performer's social network messages or replies associated with the scene. In some embodiments, user interface 600 may comprise filter 508, and if each of options 510 and 512 are selected, the one or more performers highlighted in user interface 600 for each scene may correspond to the performer associated with the user's social network profile.

User interface 600 may comprise indication 612 indicating that 100 social network messages (e.g., from one or more social network platforms) have been received that are related to scene 2, associated with image 618. The portion of user interface 600 associated with such scene may comprise an indication 614 that the performer of interest (Cara Delevingne) has responded to two of these messages, and option 616 may be provided, which may be selectable to view (and interact with) each of the performer's social network messages or replies associated with the scene. User interface 600 may additionally or alternatively comprise an indication 620 that a scene associated with image 626 is associated with 50 social network messages (e.g., from one or more social network platforms). Such scene may be associated with an indication 622 that no celebrities or performers included in the cast of media asset 102 have submitted a social network post associated with the scene, and an indication 624 that a friend of the user (associated with the user profile indicated 108) has commented on such scene, and indication 624 may be selectable to cause the friend's social network post to be presented to the user.

In some embodiments, the scenes may be ordered chronologically based on the appearances of the scenes during the media asset, or ordered (based on selections of filter 508, or any other suitable selections) to only include (or include more prominently in the list) scenes featuring performers that the user follows on one or more social network platforms. In some embodiments, filter 508 may include an option to filter scenes and/or social message posts based on whether a celebrity posted a social network message associated with the scene, and/or a performer included in the cast posted a social network message associated with the scene. In some embodiments, the most highly ranked comments (e.g., based on a level of social media activity, such as, for example, a number of likes, re-posts or comments on a particular social network post) may be more prominently displayed to the user, or used to order social media posts associated with one or more scenes of media asset 102.

In some embodiments, user interface 600 may comprise one or more options or selectable icons, e.g., image 610, image 618, image 626, or any other suitable option or icons or any combination thereof, which may be selectable to cause presentation of media asset 102 (or one or more shorter clips or snippets of media asset 102), from a time stamp associated with the selected image. Such presentation of media asset 102 or one or more portions thereof based on the selection may include presenting an icon, e.g., one or more of icon 106, 126, 206, 306, or any other suitable icon or option, and/or one or more social network messages (e.g., associated with a celebrity or other notable users messages, such as the messages associated with indication 660). For example, upon receiving selection of image 610, image 618, or image 626, the media application may access metadata associated with the scene corresponding to scene 610, and such metadata may comprise indications of time stamps of the scene and corresponding social network messages, which may be used when presenting one or more scenes of media asset 102 and corresponding social network messages associated with the scene.

Figure 7:
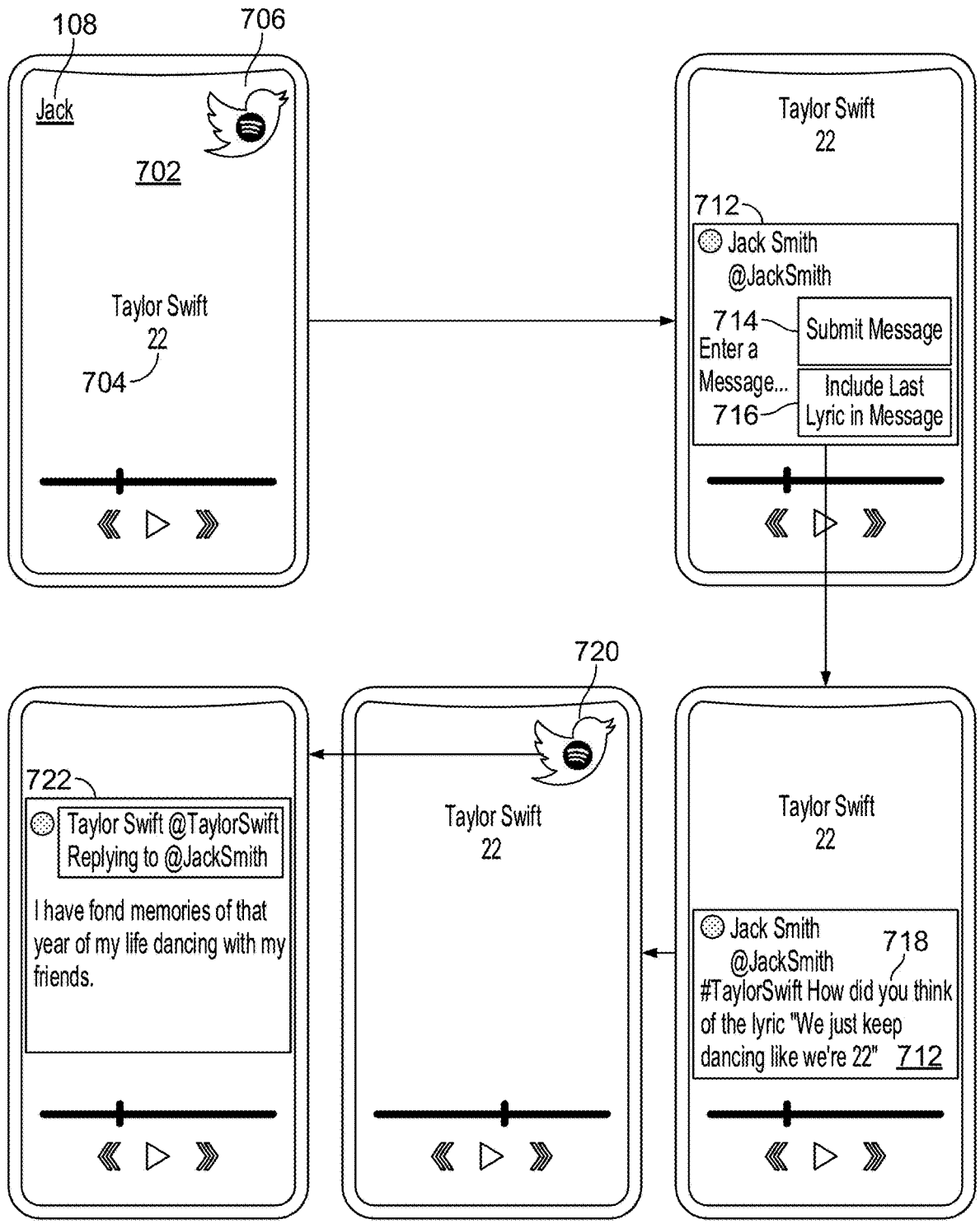
FIG. 7 shows a block diagram of an illustrative system for transmitting a request to post a message on a social network while generating for output a media asset, in accordance with some embodiments of this disclosure.

FIG. 7 shows a block diagram of an illustrative system for transmitting a request to post a message on a social network while generating for output a media asset, in accordance with some embodiments of this disclosure. The media application may provide user interface 702, e.g., in response to a user request to generate for output the media asset (e.g., a song, podcast, music video, e-book, video game, etc.) indicated at 704, received from a user profile indicated at 108. While providing audio output of audio-based media asset 704 indicated at 702 to the user (e.g., via a media service, such as, for example, Spotify®, or any other suitable media service), the media application may generate for display icon 706. Icon 706 may be selectable to enable a user to interact with a performer (e.g., Taylor Swift), celebrity or other notable figure that is associated with media asset 704 (e.g., a writer, producer, artist, etc. of media asset 704). For example, selection of icon 706 may cause the media application to provide overlay 712 (e.g., via an API of a social network platform) to enable the user to submit a social network message regarding media asset 704, e.g., directed to the performer of media asset 704, such as by selecting option 714. In some embodiments, option 716 may be provided, which may be configured to extract current, most recent, or most popular lyrics of the media asset indicated at 704, for inclusion in a social network post. In some embodiments, audio snippets of the media asset indicated at 704 may be captured and extracted for inclusion in the social network post. In some embodiments, icon 706 may be provided at all times while the media asset indicated at 704 is being consumed, in response to user input, or may be provided at times based on heuristics (e.g., a popular time that users historically requested to post a social network message during consumption of the media asset indicated at 704). In some embodiments, icon 706 may be provided in response to receiving a pause command, or selection of icon 706 may cause the media application to pause the media asset indicated at 704.

In response to receiving selection of option 714, social network message 718 may be posted to a social network platform. The user may view such message via overlay 712 within the media application, and by accessing the social network platform, e.g., via a link provided by the media application or independently of the media application. After social network post 718 is transmitted to a social network platform, the media application may resume outputting the media asset indicated at 704 (e.g., in response to receiving selection of a particular option, or in response to determining the transmission of social network message 718 is complete), or the media asset indicated at 704 may have been being output throughout the process of submitting social network 718, and icon 720 may be provided. Icon 720 may be indicative that the performer or other celebrity has replied to social network post 718 on the social network platform or otherwise published a social network post associated with social network post 718. In response to receiving selection of icon 720, the media application may retrieve for display, from the social network platform, social network message 722 replying to the message of the user, or redirect the user to the social network platform to view social network message 722.

In some embodiments, the media application may be providing a website or application (e.g., a live streaming platform) providing users with the ability to collectively view a synchronized presentation of media asset 102 and interact with one another, e.g., during a group watch or group listening party. Additionally or alternatively, the social networking application may provide such a group watch party capability (e.g., Twitter watch or listening party). Such capability may be provided in addition to in addition to plain Or single user SVOD sessions or live streams. The group watch and/or group listening party may permit multiple simultaneous users to provide comments during presentation of media asset 102 and generate for display the comments in the any suitable form (e.g., text, voice, images, emojis, or any other suitable format, or any combination thereof, etc.). In some embodiments, such multiple simultaneous users may cascade or append comments to a messaging thread and label the social network thread with a tag of the associate watch party. In some embodiments, the media application may correlate each received comment with a particular timestamp and/or scene within a duration of media asset 102. In some embodiments, certain notable users (e.g., celebrities or other performers associated with media asset 102 and/or included in a cast of media asset 102) may participate in the group watch session and request to post social media comments or responses to other social media comments during the group watch session.

Figure 8:
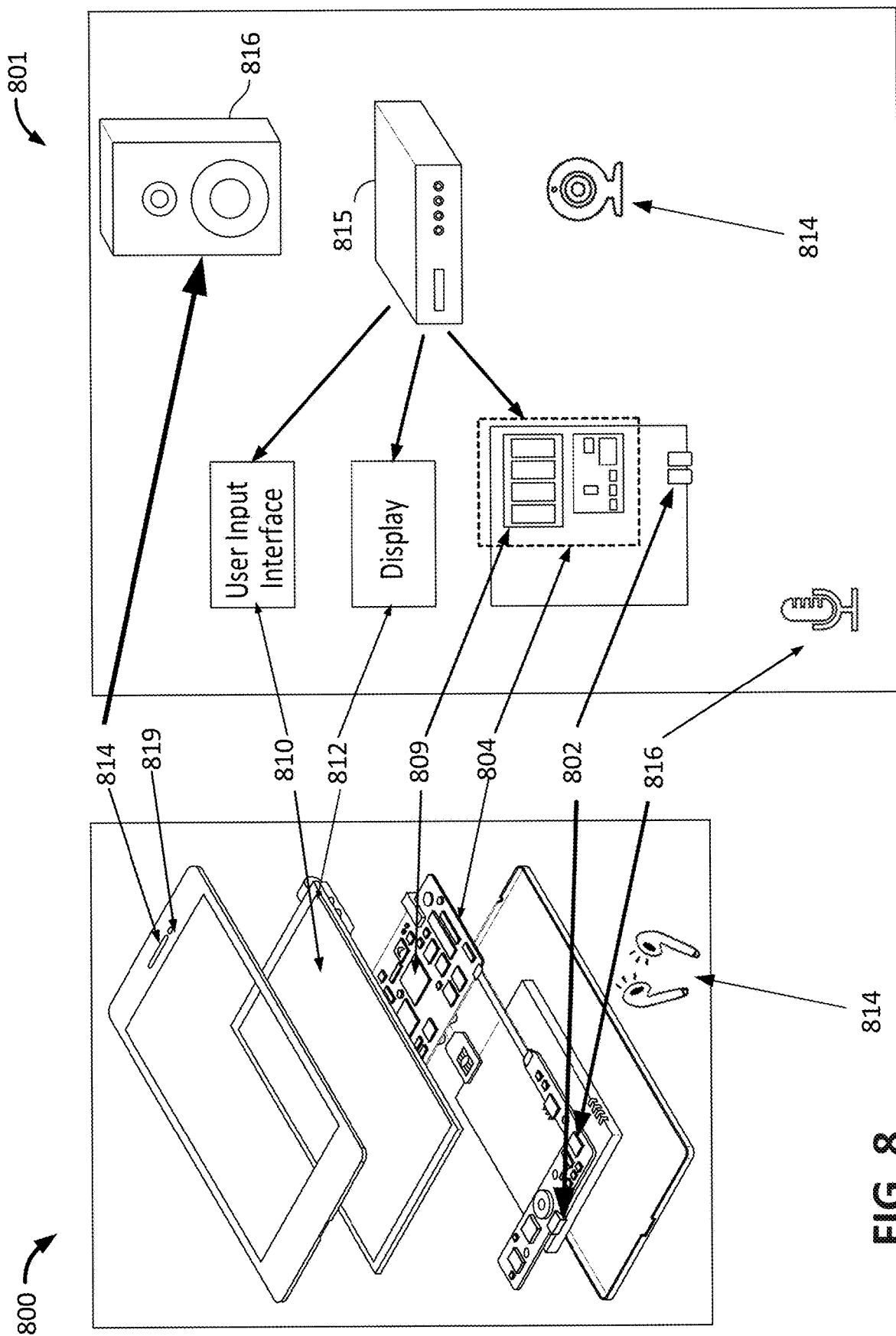
FIG. 8 shows a block diagram of an illustrative system for transmitting a request to post a message on a social network while generating a media asset for presentation, in accordance with some embodiments of this disclosure.
Figure 9:
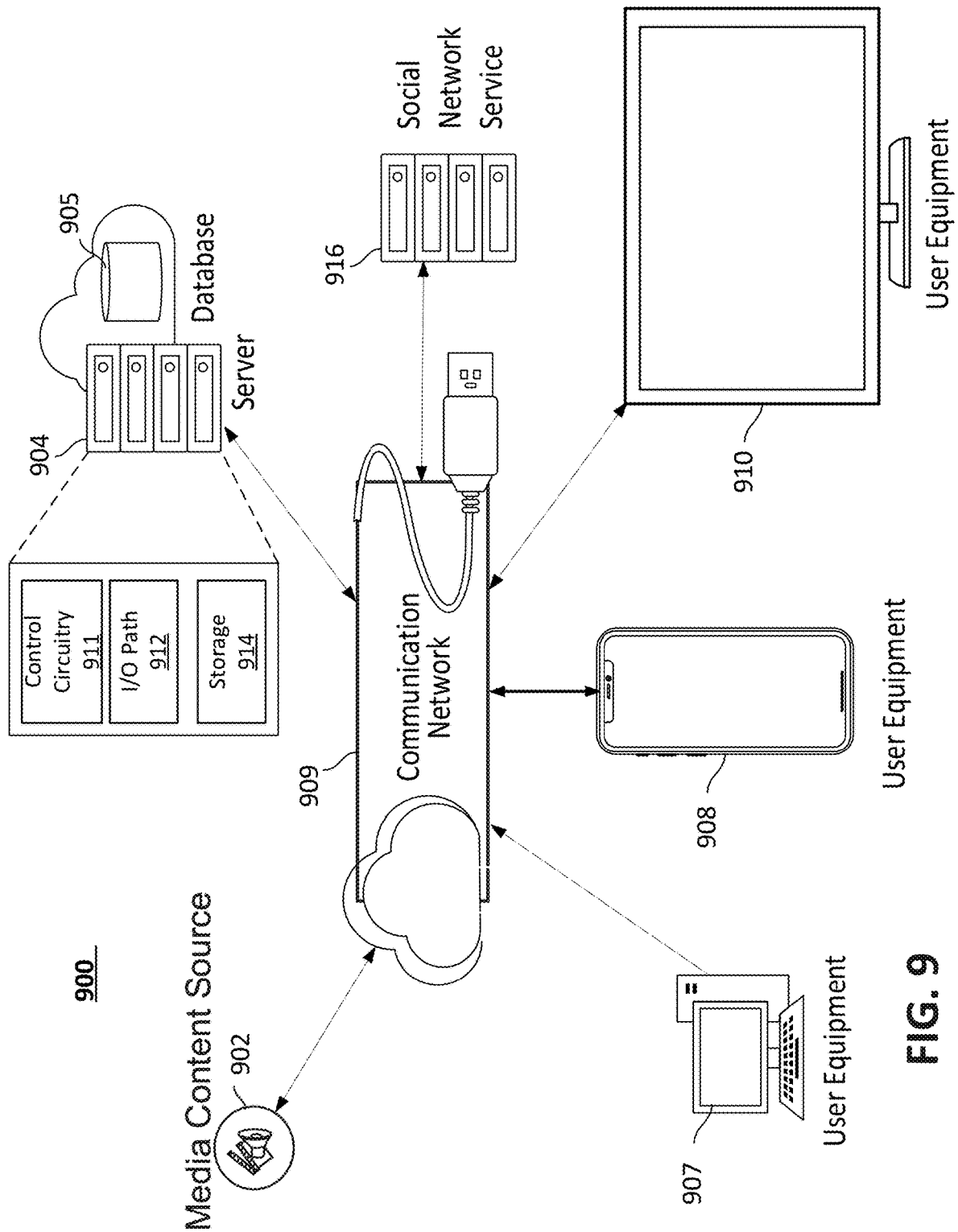
FIG. 9 shows illustrative user equipment devices, in accordance with some embodiments of this disclosure.
Figure 10A:
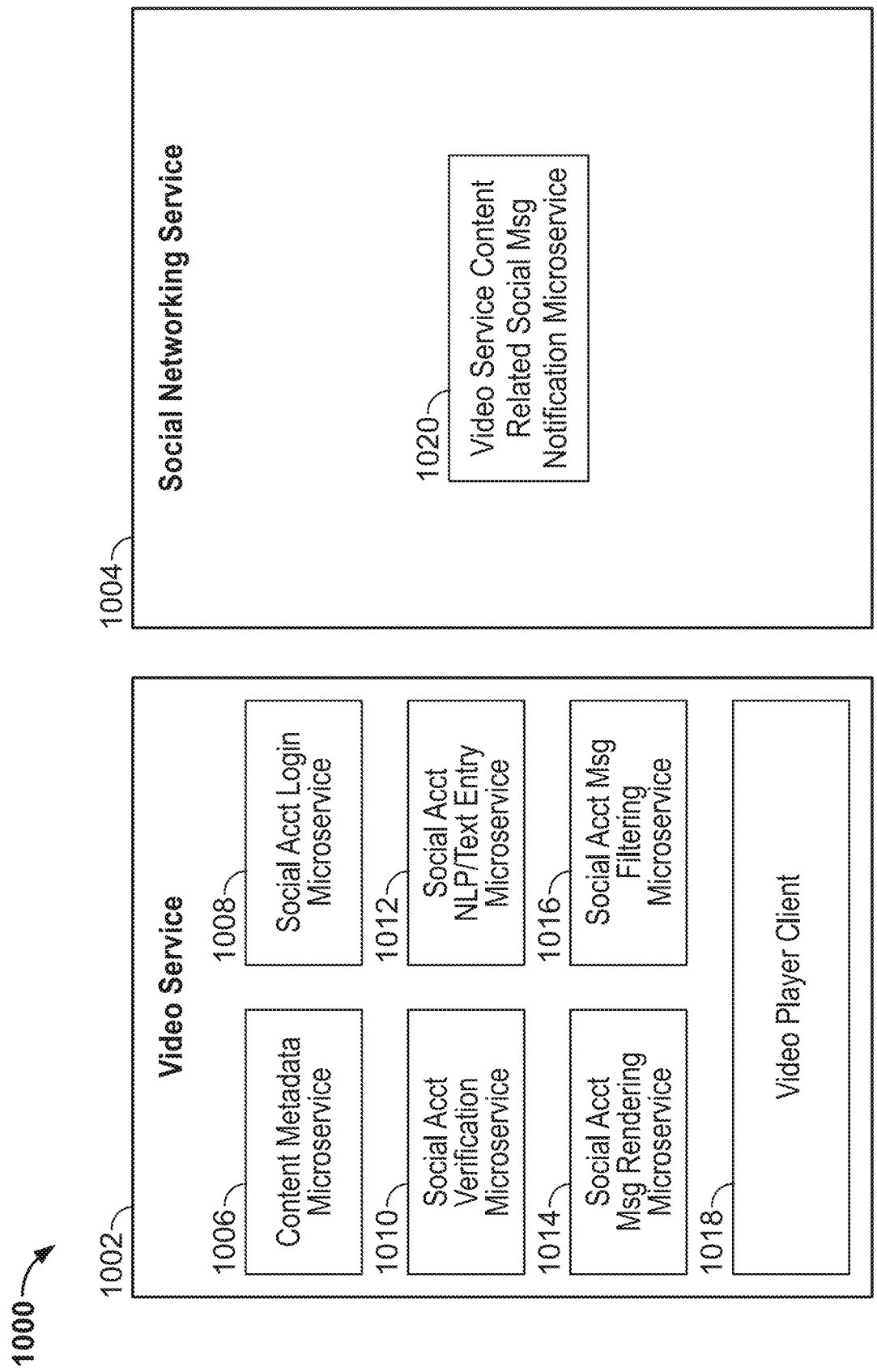

FIGS. 8-9 describe illustrative devices, systems, servers, and related hardware for transmitting a request to post a message on a social network while generating for output a media asset, in accordance with some embodiments of this disclosure. FIG. 8 shows generalized embodiments of illustrative user equipment devices 800 and 801, which may correspond to, e.g., user equipment device 104, a device at which video client player 1018 of FIG. 10A is implemented, etc. For example, user equipment device 800 may be a smartphone device, a tablet, a virtual reality or augmented reality device, or any other suitable device capable of consuming media assets and capable of transmitting and receiving data over a communication network. In another example, user equipment device 801 may be a user television equipment system or device. User television equipment device 801 may include set-top box 815. Set-top box 815 may be communicatively connected to microphone 816, audio output equipment (e.g., speaker or headphones 814), and display 812. In some embodiments, microphone 816 may receive audio corresponding to a voice of a user, e.g., a voice command. In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 9. In some embodiments, device 800 may comprise any suitable number of sensors, as well as a GPS module (e.g., in communication with one or more servers and/or cell towers and/or satellites) to ascertain a location of device 800.

Each one of user equipment device 800 and user equipment device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 9 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the media application stored in memory (e.g., storage 808). Specifically, control circuitry 804 may be instructed by the media application to perform the functions discussed above and below. In some implementations, processing or actions performed by control circuitry 804 may be based on instructions received from the media application.

In client/server-based embodiments, control circuitry 804 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the media application may be a client/server application where only the client application resides on device 800, and a server application resides on an external server (e.g., server 904 and/or server 916). For example, the media application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 904 and/or social network service 916), referred to as "the cloud." Device 900 may be a cloud client that relies on the cloud computing capabilities from server 904 to determine whether processing should be offloaded and facilitate such offloading. When executed by control circuitry of server 804 or 911, the media application may instruct control circuitry 804 or 911 circuitry to perform processing tasks for the client device and facilitate a media consumption session integrated with social network services. The client application may instruct control circuitry 804 to determine Whether processing should be offloaded.

Control circuitry 804 may include communications circuitry suitable for communicating with a server, social network service, a table or database server, or other networks or servers The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The media application may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide media consumption and social network interaction functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a media application and social network profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the media application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the media application may be downloaded and interpreted or otherwise run by an interpreter or virtual machine (run by control circuitry 804). In some embodiments, the media application may be encoded in the ETV Binary Interchange Format (EBIF), received by control circuitry 804 as part of a suitable feed, and interpreted by a user agent running on control circuitry 804. For example, the media application may be an EBIF application. In some embodiments, the media application may be defined by a series of JAVA-based files that are received and run by a local virtual machine or other suitable middleware executed by control circuitry 804. In some of such embodiments (e.g., those employing MPEG-2 or other digital media encoding schemes), the media application may be, for example, encoded and transmitted in an MPEG-2 object carousel with the MPEG audio and video packets of a program.

FIG. 9 is a diagram of an illustrative system 900 for transmitting a request to post a message on a social network while generating a media asset for presentation, in accordance with some embodiments of this disclosure. User equipment devices 907, 908, 910 (e.g., which may correspond to one or more of user equipment device 104, a device at which video client player 1018 of FIG. 10A is implemented, etc.) may be coupled to communication network 906. Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more social network services. In some embodiments, the media application may be executed at one or more of control circuitry 911 of server 904 (and/or control circuitry of user equipment devices 907, 908, 910. In some embodiments, data structure 300 of FIG. 3, may be stored at database 905 maintained at or otherwise associated with server 904, and/or at storage of one or more of user equipment devices 907, 908, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide media consumption data, social networking data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths. I/O path 912 may comprise I/O circuitry.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

FIG. 10A shows a block diagram of an illustrative system 1000 for transmitting a request to post a message on a social network while generating a media asset for presentation, in accordance with some embodiments of this disclosure. System 1000 may comprise media consumption service 1002 in communication with social networking service 1004. Media service 1002 may comprise content metadata microservice 1006, social network account login microservice 1008, social network account verification microservice 1010, social network account natural language processing (NLP)/text entry microservice 1012, social network account message rendering microservice 1014, social network account message filtering microservice and media client player 1018. Social networking service 1004 may comprise media service content-related social message notification microservice. In some embodiments, media consumption service 1002 may be implemented by one or more of media content source 902, server 904, database 905, and/or control circuitry of one or more of user equipment devices 907, 908, 910. In some embodiments, social networking service 1004 may correspond to social networking service 916.

FIG. 10B is a flowchart of a detailed illustrative process 1001 for transmitting a request to post a message on a social network while generating a media asset for presentation, in accordance with some embodiments of this disclosure. In various embodiments, the individual steps of process 1001 may be implemented by one or more components of the devices and systems of FIGS. 1-10A. Although the present disclosure may describe certain steps of process 1001 (and of other processes described herein) as being implemented by certain components of the devices and systems of FIGS. 1-10A, this is for purposes of illustration only, and it should be understood that other components of the devices and systems of FIGS. 1-10A may implement those steps instead.

At 1022, social network account login microservice 1008 (e.g., implemented by the media application being executed at least in part at user equipment device 104 of FIG. 1) may receive, from a user (e.g., associated with the media application user profile indicated at 108), login credentials associated with a profile of the user with a social network service provider 1004. For example, social network account login microservice 1008 may implement a user interface portion at which the user can enter his or her credentials for transmission to the social network service. Social network service 1004 may validate the user profile of the user with the social network service, or authorize the media application to perform such validation on its behalf.

At 1024, media client player 1018 (e.g., implemented by the media application being executed at least in part at user equipment device 104 of FIG. 1) may receive a request to register the social network profile of a user (having been validated at 1022), and preferences for social network message notifications. For example, media client player 1018 may receive via user interface 400 of FIG. 4 a selection of option 402 to register one or more social network profiles (e.g., Twitter, Facebook, Instagram, etc.) in association with a profile of the user with the media application. In some embodiments, media client player 1018 may receive preferences for social message notifications, e.g., for which platforms notifications of social network posts should be provided, a manner in which such notifications should be provided, etc. The registration request and preferences may be transmitted to and received by a server (e.g., server 904 of FIG. 9, associated with the media application).

At 1026, content metadata microservice 1006 may determine media asset information (e.g., celebrity data of celebrities or performers associated with a requested media asset, such as, for example, based on media asset metadata stored at server 904 or media content source 902). A request may have been received from a user accessing the media application, e.g., via user equipment device 104 of FIG. 1, to begin playing a media asset, e.g., media asset 102 of FIG. 1. At 1028, based on the received metadata information, social network account verification microservice 1010 may determine authentic social network accounts or profiles associated with the celebrities or performers indicated in the metadata on one or more social media platforms. For example, social network account verification microservice 1010 may analyze a number of followers, connections or friends, links to other verified social network accounts or profiles, etc., that a particular social network profile matching the metadata information is associated with.

At 1030, media client player 1018 may receive a request to pause the media asset, e.g., media asset 102, being generated for presentation, e.g., at the request of the user. Media client player 1018 may further receive a social media message, e.g., via input entered at overlay 112 and/or such social media message may include a captured image frame at the pause position. For example, at 1032 and 1034, video client player 1018 may extract an I-frame from media asset 102, and forward such extracted frame, and any received input (e.g., text or voice input, to construct a portion of social media message 120) in association with the social media message, to social network account NLP/text entry microservice 1012.

At 1036, microservice 1012 may be configured to construct a social network message based on the image frame captured at 1032 and the input received at 1034. The social network message, based on a request from the user, may be directed to or mention a performer or celebrity associated with the media asset being consumed. In some embodiments, microservice 1012 may prepopulate the social media message with hashtags related to the media asset (e.g., the names of performers or characters in the media asset, the title of the media asset, the genre of the media asset, etc.). At 1038, microservice 1012 may be configured to transmit the constructed social media message to social networking service 1004, and at 1040, microservice 1016 of the media application may request to subscribe to a notification API provided by social networking service 1004, e.g., based on preferences specified by the user at 1024.

Figure 11:
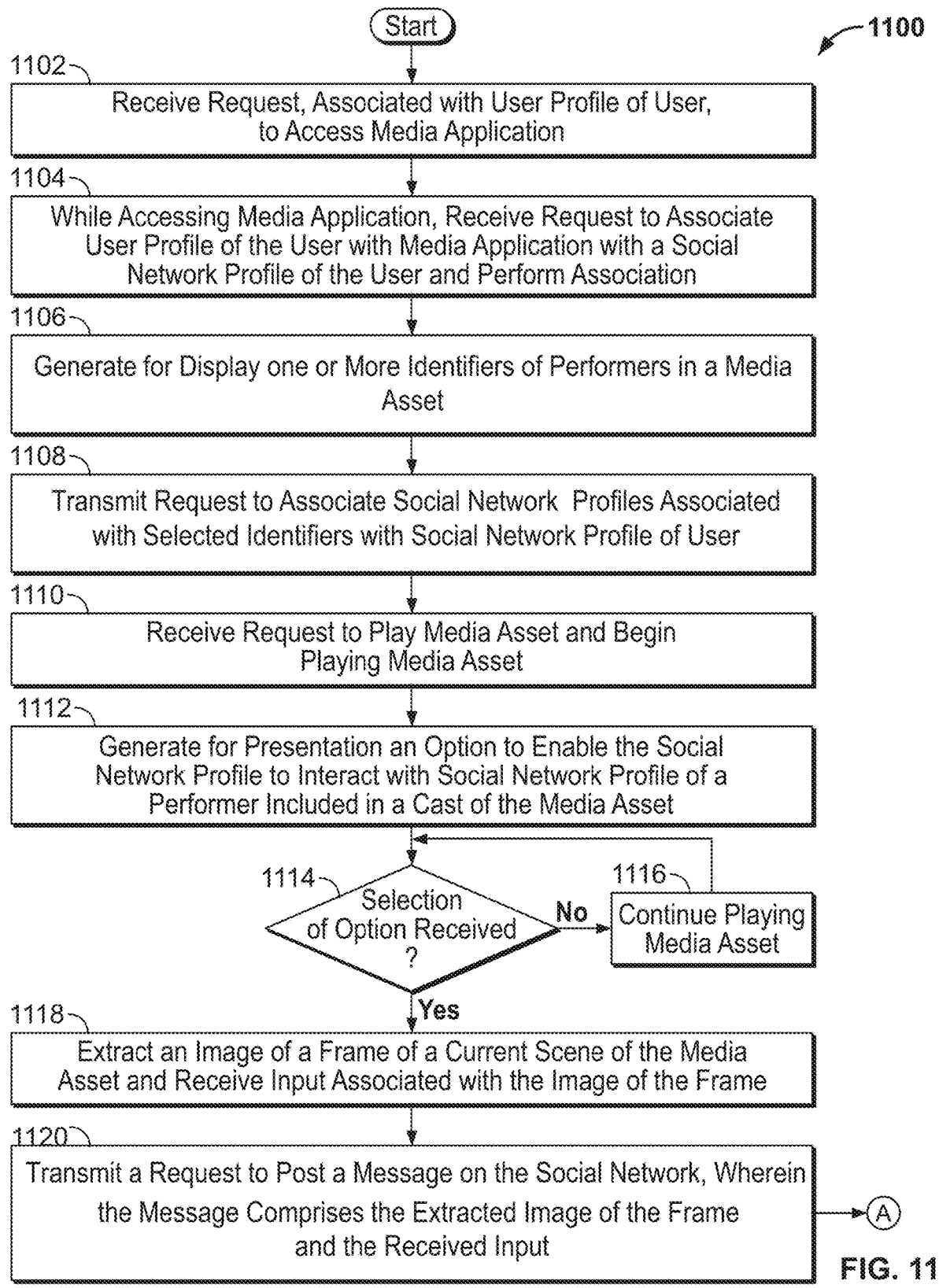
FIG. 11 is a flowchart of a detailed illustrative process for transmitting a request to post a message on a social network while generating a media asset for presentation, in accordance with some embodiments of this disclosure.

At 1042, microservice 1016 may receive a published social network message, e.g., submitted to the social networking service 1004 by a celebrity or performer mentioned in the social media message constructed by the user. At 1044, social network filtering microservice 1016 may perform filtering of such social network message based on response type (e.g., whether the message is received from the celebrity mentioned in the user's social network message, or other celebrity, or a user not subscribed to the media application but only to the social networking service). Such filtering may be performed based on preferences specified by the user (e.g., selection of an option to provide notifications only if the message is from a performer in the cast of the media asset being consumed). The filtered message may be transmitted to video client player 1018. At 1046, video client player 1018 may provide a notification (e.g., notification 126 of FIG. 1) to the user and/or cause the media asset to be stored and render the social network message received at 1046 to the user for user consumption and user interaction FIG. 11 is a flowchart of a detailed illustrative process 1100 for transmitting a request to post a message on a social network while generating a media asset for presentation, in accordance with some embodiments of this disclosure. In various embodiments, the individual steps of process 1100 may be implemented by one or more components of the devices and systems of FIGS. 1-10. Although the present disclosure may describe certain steps of process 1100 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1102, I/O circuitry (e.g., I/O circuitry 802 of user equipment device 800, and/or I/O circuitry 912 of server 904) may receive a request, associated with a user profile of a user (e.g., the user profile indicated at 108 of FIG. 1, such as, for example, by way of user equipment device 104 of FIG. 1), to access a media application. For example, the I/O circuitry may receive login credentials of the user, and compare such login credentials to those stored at a database (e.g., database 905 of FIG. 9) to determine that the user is associated with a user profile that is authorized to access media assets via the media application.

At 1104, the I/O circuitry, while accessing the media application, may receive a request to associate the user profile of the user with the media application user (e.g., the user profile indicated at 108 of FIG. 1) with a social network profile of the user (e.g., with one or more social network platforms indicated at user interface 401 of FIG. 4). In some embodiments, the association may be performed by control circuitry (e.g., control circuitry 804 of FIG. 8 and/or control circuitry 911 of FIG. 9) in response to receiving an indication from the selected social network platform that the user profile of the user with the social network platform has been validated.

At 1106, control circuitry (e.g., control circuitry 804 of FIG. 8 and/or control circuitry 911 of FIG. 9) may generate for display one or more selectable identifiers of performers in a media asset. In some embodiments, such identifiers may be selectable to enable association of the social network profile of the user with respective social network profiles of the performers. For example, user interface 500 of FIG. 5A may be provided, in which options 502 and 504 are selectable to associate the user profile of the user with the social networking platform with a social networking profile of the performer.

At 1108, the control circuitry may transmit a request (e.g., to the appropriate social networking platform) to associate the social network profile of a performer of a media asset (e.g., media asset 102 of FIG. 1) with the social network profile associated with the user profile. Such request may be transmitted in response to receiving a selection of one or more of the options associated with the identifiers at 1106. For example, such request may be received via user interface 500, by way of receiving selection of option 504 associated with the performer, and may be received during presentation of the media asset (e.g., while media asset 102 is paused or playing) or while accessing menu screens of the media application when no media assets are being played. In some embodiments, the control circuitry may receive an indication that the user and the performer are associated via the social networking platform.

At 1110, the I/O circuitry may receive a request to play a media asset (e.g., media asset 102 of FIG. 1, and associated with the performers associated with options 502 and 504 of FIG. 5) and begin playing the media asset. In some embodiments, the request to play the media asset may be received from a second screen device (e.g., a mobile device acting as a remote control) to play the media asset on a first device (e.g., user equipment device 104 of FIG. 1).

At 1112, control circuitry (e.g., control circuitry 804 of FIG. 8 and/or control circuitry 911 of FIG. 9) may generate for presentation an option (e.g., notification 106 of FIG. 1) to enable the social network profile of the user to interact with a social network profile of a performer included in a cast of the media asset. In some embodiments, the option may be received in the form of a voice command uttered by the user requesting to post a social media message, additionally or alternatively to generating for display notification 106. At 1114, the control circuitry may determine whether selection of the option has been received. If no selection of the option is received, at 1116, the media asset may continue to be played; otherwise, processing may proceed to 1118.

At 1118, in response to determining that selection of the option has been received at 1114, the control circuitry may extract an image of a frame of a current scene of the media asset, and receive input associated with the image of the frame. For example, image 122 may be extracted from scene 101 of FIG. 1, and the input indicated at 124 may be received from the user. In some embodiments, the control circuitry may suggest or prepopulate certain terms (e.g., hashtags, genre data) based on metadata of the media asset. In some embodiments, the media asset may be paused while the user is entering such input, or the media asset may continue to be played with overlay 112 displayed over a portion of the media asset. In some embodiments, certain portions of a scene (e.g., scene 101 of FIG. 1) associated with the extracted image may be cropped out, e.g., to omit insignificant or less famous performers or any other portions of the scene unlikely to be noteworthy to the user.

At 1120, the control circuitry may transmit a request, to the relevant social networking service, to post social network media message 122 comprising received input 124 and extracted image 122 of a particular scene 101 of media asset 102. Such transmission may enable a plurality of devices to access the message via the social networking service. Processing may then proceed to A and FIG. 12. In some embodiments, the control circuitry may generate metadata associated with one or more of the social network posts, which may be used in the current or subsequent consumption sessions of the media asset to generate for presentation notifications or indications of the social network posts associated with the scene, e.g., during presentation or output of the scene and/or when such scene is paused.

Figure 12:
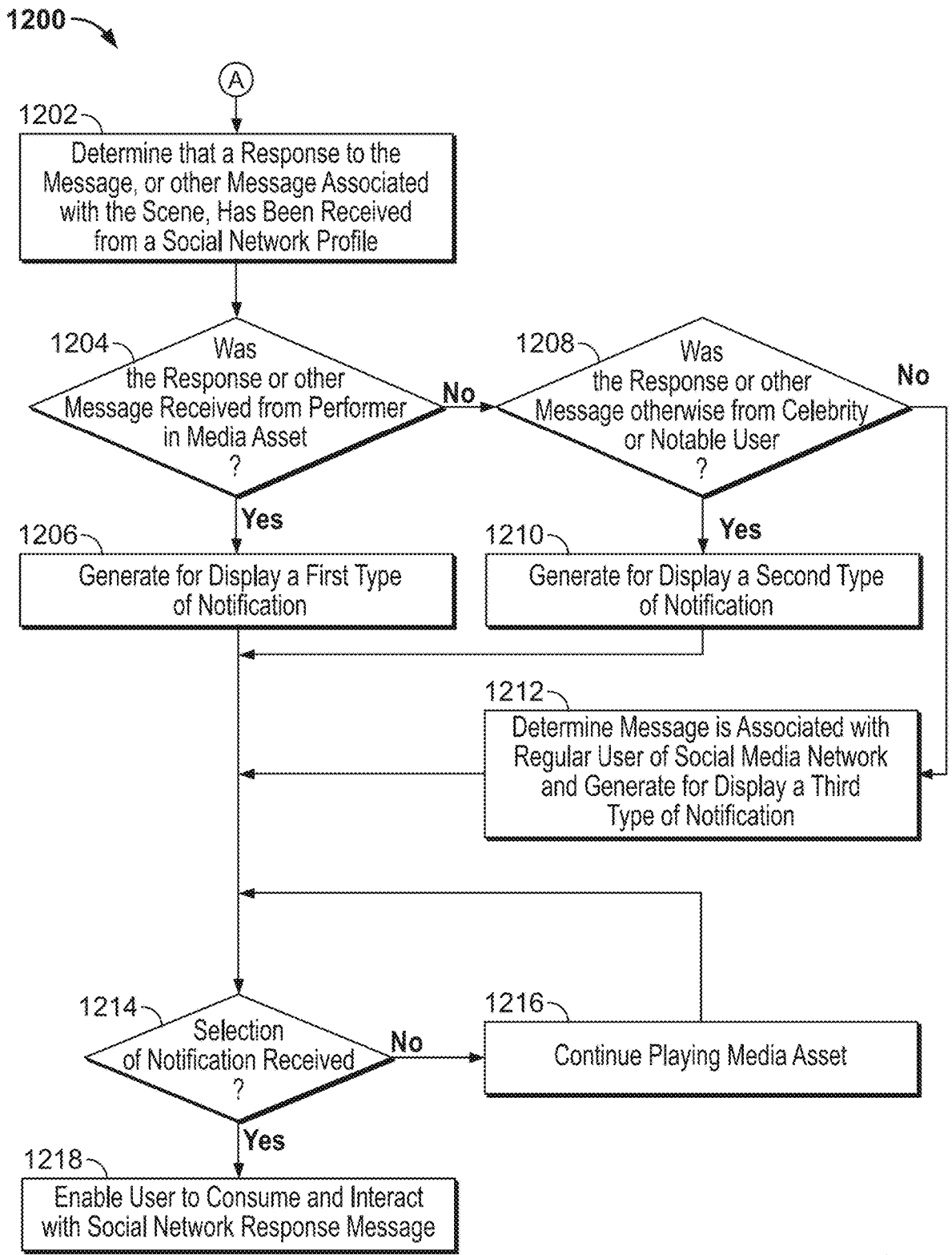
FIG. 12 is a flowchart of a detailed illustrative process for transmitting a request to post a message on a social network while generating a media asset for presentation, in accordance with some embodiments of this disclosure.

FIG. 12 is a flowchart of a detailed illustrative process for transmitting a request to post a message on a social network while generating a media asset for presentation, in accordance with some embodiments of this disclosure. In various embodiments, the individual steps of process 1200 may be implemented by one or more components of the devices and systems of FIGS. 1-10. Although the present disclosure may describe certain steps of process 1200 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1202, control circuitry (e.g., control circuitry 804 of FIG. 8 and/or control circuitry 911 of FIG. 9) may determine that a response message (e.g., social media message 128 of FIG. 1) to the social network message (associated with the request transmitted at 1120), or other message associated with the scene, has been received from a device (e.g., device 800 of FIG. 8) associated with a social network profile. For example, such determination may be based on receiving an indication from the social networking service regarding the response message.

At 1202, the control circuitry may determine whether the response or other message associated with the user's social network message (e.g., social network message 120 of FIG. 1) was received from the performer (e.g., performer 107 of scene 101 of FIG. 1). For example, the control circuitry may compare a user name associated with the social media response message to metadata of the performer and determine whether there is a match, or receive an indication from the social networking service that there is a match. If the social media response message is determined to have been received from or associated with the performer, processing may proceed to 1206; otherwise, processing may proceed to 1208.

At 1206, the control circuitry may generate for display a first type of notification (e.g., notification 126), which may indicate to the user that the social media response determined to have been received at 1202 is from a social networking account of a performer included in a cast of the media asset being consumed. For example, notification 126 may be generated for display and/or associated with audio or haptic output, in a manner that is distinct from notifications associated with messages received from non-celebrities or celebrities not associated with the media asset of the consumption session. In some embodiments, notification 126 may comprise an image or text indicating the performer that is associated with the social network response, and/or the performer may be highlighted or emphasized on the screen to indicate to the user that the social network response is from such performer.

At 1208, if the social network response message is determined not to have been received from a social networking profile of the performer (e.g., the subject of the user's social media message 120 of FIG. 1), the control circuitry may determine whether the response or other message is otherwise associated with a social networking profile or account of a celebrity or notable user. For example, by comparing a user name or other information of the social networking profile associated with the social network response message, the control circuitry may determine that, while the message is not from the performer included in the cast of the media asset, the message is from another celebrity or notable user (e.g., a director of the movie) who may be of interest to the user. If so, processing may proceed to 1210; otherwise, processing may proceed to 1212. At 1210, a notification may be generated for presentation to the user indicative of the source of the social network message being another celebrity or notable user. In some embodiments, such notification may differ in the manner of its presentation from the first type of notification, or may be similar to the first type of notification.

At 1212, the control circuitry may determine that the social network response message is associated with regular user of social media network and generate for display a third type of notification, e.g., notification 306 of FIG. 3, which may differ from the first and second types of notification in the manner of its presentation to the user. For example, notification 306 may be presented as smaller and/or less conspicuous than notification 106, since notification 306 is not associated with a celebrity or performer included in the cast of the media asset. In some embodiments, playing of the media asset may be paused when any of the types of notifications or icons are presented.

At 1214, the control circuitry may determine whether selection of the notification has been received. If no such selection is received (e.g., after a predefined period of time), playing of the media asset may resume (e.g., if such playing has been paused) at 1216. If selection of the notification has been received, the control circuitry may enable the user to consume and interact with the received social network message (at 1218). For example, in the example of FIG. 1, social media message 128 may be presented to the user, and in the example of FIG. 7, social media message 722 may be presented to the user. In some embodiments, the control circuitry may generate metadata associated with one or more of the social network posts, which may be used in the current or subsequent consumption sessions of the media asset to generate for presentation notifications or indications of the social network posts associated with the scene, e.g., during presentation or output of the scene and/or when such scene is paused. In some embodiments, the user may consume and interact with the social network response message by selecting one or more options, e.g., image 610, image 618, image 626, and the control circuitry may generate media asset 102 for presentation, e.g., from the scene associated with the selected image, and generate one or more social media messages (e.g., received from the celebrity, or other notable user, or a friend of the user, or any other suitable user or any combination thereof) for presentation to the user.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating a media asset for presentation during a consumption session associated with a user profile;
   while generating for presentation the media asset:
   generating for presentation an option to enable a social network profile, associated with a social network and associated with the user profile, to interact with a social network profile of a performer included in a cast of the media asset;
   in response to receiving selection of the option, extracting an image of a first frame of a first scene of the media asset, being presented when the selection is received, and receiving input associated with the image of the first frame; and
   transmitting a request to post a message on the social network, wherein the message comprises the extracted image of the first frame and the received input, and the transmitting enables a plurality of devices to access the message via the social network;

determining that a response to the message, associated with the first scene of the media asset, has been received from the social network profile associated with the performer, and associating the response with metadata for the first scene;

determining, based on metadata for a second scene of a media asset, that at least one response, from at least one device associated with at least one social network profile associated with at least one regular user, has been received to one or more messages from users of the social network, in association with the second scene; and while the media asset is being generated for display, and in response to determining that the response to the message has been received from the social network profile associated with the performer in association with the first scene and that the at least one response to the one or more messages has been received from the at least one regular user in association with the second scene, generating for simultaneous presentation:
- at a first portion of a user interface, the first frame of the first scene and a first indication that the response to the message has been received from the performer in association with the first scene, wherein the first indication is selectable to access the response from the performer; and
- at a second portion of the user interface, a second frame of the second scene and a second indication that the at least one response to the one or more messages has been received from the at least one regular user in association with the second scene, wherein the second indication is selectable to access the at least one response from the at least one regular user, and wherein an appearance of the second indication is based on a type of indications for regular users and differs from an appearance of the first indication which is based on a type of indications for performers included in the cast of the media asset.

2. The method of claim 1, further comprising:
prior to generating for presentation the option to enable the social network profile associated with the user profile to interact with the social network profile of the performer, generating for presentation an option to associate the social network profile of the performer with the social network profile associated with the user profile; and in response to receiving selection of the option to associate the social network profile of the performer with the social network profile associated with the user profile, transmitting a request to associate the social network profile of the performer with the social network profile associated with the user profile.

3. The method of claim 1, further comprising:
generating the metadata associating the response to the message from the performer, and the message comprising the extracted image of the first frame and the received input, with a timestamp of the first scene; and generating for presentation a notification, during the presentation of the first scene in a subsequent consumption session occurring at a later time than the consumption session, that is selectable to access the response to the message from the performer and the message.

4. The method of claim 1, further comprising:
identifying a portion of the extracted image that should be cropped out or otherwise modified; and
cropping out or otherwise modifying the identified portion.

5. The method of claim 1, further comprising:
populating the input associated with the image of the first frame with text based on metadata of the media asset or based on historical social network posts of the social network profile associated with the user profile.

6. The method of claim 1, wherein the media asset is an audio-based media asset, and the method further comprises:
determining a lyric associated with the audio-based media asset;
extracting the lyric of the audio-based media asset; and
recommending the extracted lyric for inclusion in the message to be posted on the social network.

7. The method of claim 1, further comprising:
generating for display a plurality of identifiers corresponding to respective performers included in the cast of the media asset;
providing a plurality of options to associate the social network profile associated with the user profile with respective social network profiles of a plurality of performers included in the cast of the media asset; and
generating an option for presentation that is selectable to adjust an order of the plurality of identifiers based on a frequency that the respective performers associated with the plurality of identifiers use their respective social network profiles to respond to messages received from social network profiles of users.

8. The method of claim 1, further comprising:
in response to determining that the response to the message has been received from the social network profile associated with the performer, identifying a next scene during the presentation of the media asset that depicts the performer; and
while generating for presentation the next scene, highlighting the depiction of the performer and providing an icon that is selectable to access the response to the message.

9. The method of claim 1, wherein:
the first indication for the first scene indicates a number of responses that have been received from the performer and identifies the performer; and
the second indication for the second scene indicates a number of responses that have been received from the at least one regular user.

10. A system comprising:
input/output (I/O) circuitry; and
control circuitry configured to:
generate a media asset for presentation during a consumption session associated with a user profile;
while generating for presentation the media asset:
generate for presentation an option to enable a social network profile, associated with a social network and associated with the user profile, to interact with a social network profile of a performer included in a cast of the media asset;
in response to receiving, via the I/O circuitry, selection of the option, extract an image of a first frame of a first scene of the media asset being presented when the selection is received, and receive input associated with the image of the first frame; and
transmit a request to post a message on the social network, wherein the message comprises the extracted image of the first frame and the received input, and the transmitting enables a plurality of devices to access the message via the social network;
determine that a response to the message, associated with the first scene of the media asset, has been received from the social network profile associated with the performer, and associate the response with metadata for the first scene;

determine, based on metadata for a second scene of a media asset, that at least one response, from at least one device associated with at least one social network profile associated with at least one regular user, has been received to one or more messages from users of the social network, in association with the second scene; and while the media asset is being generated for display, and in response to determining that the response to the message has been received from the social network profile associated with the performer in association with the first scene and that the at least one response to the one or more messages has been received from the at least one regular user in association with the second scene, generate for simultaneous presentation:

at a first portion of a user interface, the first frame of the first scene and a first indication that the response to the message has been received from the performer in association with the first scene, wherein the first indication is selectable to access the response from the performer; and at a second portion of the user interface, a second frame of the second scene and a second indication that the at least one response to the one or more messages has been received from the at least one regular user in association with the second scene, wherein the second indication is selectable to access the at least one response from the at least one regular user, and wherein an appearance of the second indication is based on a type of indications for regular users and differs from an appearance of the first indication which is based on a type of indications for performers included in the cast of the media asset.

11. The system of claim 10, wherein the control circuitry is further configured to:

prior to generating for presentation the option to enable the social network profile associated with the user profile to interact with the social network profile of the performer, generate for presentation an option to associate the social network profile of the performer with the social network profile associated with the user profile; and in response to receiving selection of the option to associate the social network profile of the performer with the social network profile associated with the user profile, transmit a request to associate the social network profile of the performer with the social network profile associated with the user profile.

12. The system of claim 10, wherein the control circuitry is further configured to:

generate the metadata associating the response to the message from the performer, and the message comprising the extracted image of the first frame and the received input, with a timestamp of the first scene; and generate a notification for presentation, during the presentation of the first scene in a subsequent consumption session occurring at a later time than the consumption session, that is selectable to access the response to the message from the performer and the message.

13. The system of claim 10, wherein the control circuitry is further configured to:

identify a portion of the extracted image that should be cropped out or otherwise modified; and crop out or otherwise modify the identified portion.

14. The system of claim 10, wherein the control circuitry is further configured to:

populating the input associated with the image of the first frame with text based on metadata of the media asset based on historical social network posts of the social network profile associated with the user profile.

15. The system of claim 10, wherein the media asset is an audio-based media asset, and the control circuitry is further configured to:

determine a lyric associated with the audio-based media asset;

extract the lyric of the audio-based media asset; and recommend the extracted lyric for inclusion in the message to be posted on the social network.

16. The system of claim 10, wherein the control circuitry is further configured to:

generate for display a plurality of identifiers corresponding to respective performers included in the cast of the media asset;

provide a plurality of options to associate the social network profile associated with the user profile with respective social network profiles of a plurality of performers included in the cast of the media asset; and generate an option for presentation that is selectable to adjust an order of the plurality of identifiers based on a frequency that the respective performers associated with the plurality of identifiers use their respective social network profiles to respond to messages received from social network accounts of users.

* * * * *